United States Patent [19]
Gorshe et al.

[11] Patent Number: 5,355,362
[45] Date of Patent: Oct. 11, 1994

[54] DIGITAL LOOP CARRIER SYSTEM

[75] Inventors: Steven S. Gorshe, Beaverton, Oreg.; Hitoshi Sato, Tokyo, Japan

[73] Assignee: NEC America, Inc., Melville, N.Y.

[21] Appl. No.: 966,335

[22] Filed: Oct. 26, 1992

[51] Int. Cl.$^5$ .......................... H04J 3/12; H04Q 11/04
[52] U.S. Cl. ...................... 370/16.1; 370/55; 370/58.3; 370/68.1; 370/84; 370/85.5; 370/85.11; 370/85.15; 370/102; 370/105.1; 370/110.1; 370/112; 340/825.05; 340/825.16; 340/825.36; 379/269; 379/279
[58] Field of Search .................. 370/13, 14, 16, 16.1, 370/53, 54, 55, 56, 58.1, 58.2, 58.3, 77, 79, 84, 851–85.5, 85.9, 60, 85.11–85.15, 94.1–94.3, 100.1, 102, 105.1, 110.1, 112.99, 68, 68.1, 118; 340/825.05, 825.06, 825.16, 825.17, 825.34, 825.36, 825.37, 825.5, 825.51; 379/93, 94, 156, 164, 165, 242, 268, 269, 279; 359/115, 118, 135, 137

[56] References Cited

U.S. PATENT DOCUMENTS

| | | | |
|---|---|---|---|
| 4,445,213 | 4/1984 | Baugh et al. | 370/79 |
| 4,577,314 | 3/1986 | Chu et al. | 370/94.1 |
| 4,653,047 | 3/1987 | Vij et al. | 370/85.11 |
| 4,719,617 | 1/1988 | Yanosy, Jr. et al. | 370/110.1 |
| 4,731,785 | 3/1988 | Ferenc et al. | 370/60 |
| 4,737,950 | 4/1988 | Fechalos | 370/56 |
| 4,748,618 | 5/1988 | Brown et al. | 370/99 |
| 4,751,697 | 6/1988 | Hunter et al. | 370/60 |
| 4,789,981 | 12/1988 | Yanosy, Jr. et al. | 370/110.1 |
| 4,805,166 | 2/1989 | Ardon et al. | 370/58.1 |
| 4,819,228 | 4/1989 | Baran et al. | 370/94.2 |
| 4,866,704 | 9/1989 | Bergman | 370/85.4 |
| 4,893,306 | 1/1990 | Chao et al. | 370/94.2 |
| 4,905,231 | 2/1990 | Leung et al. | 370/94.1 |
| 4,962,497 | 10/1990 | Ferenc et al. | 370/60.1 |
| 4,967,405 | 10/1990 | Upp et al. | 370/58.1 |
| 4,970,721 | 11/1990 | Aczel et al. | 370/58.1 |
| 4,993,019 | 2/1991 | Cole et al. | 370/67 |
| 4,998,242 | 3/1991 | Upp | 370/60 |
| 5,029,333 | 7/1991 | Graves et al. | 370/58.1 |
| 5,040,170 | 8/1991 | Upp et al. | 370/99 |
| 5,046,067 | 9/1991 | Kimbrough | 370/110.1 |
| 5,060,227 | 10/1991 | Finley et al. | 370/58.1 |
| 5,105,420 | 4/1992 | Ardon et al. | 370/54 |
| 5,161,152 | 11/1992 | Czerwiec et al. | 370/58.1 |

Primary Examiner—Alpus H. Hsu
Attorney, Agent, or Firm—Sughrue, Mion, Zinn, Macpeak & Seas

[57] ABSTRACT

A telecommunication network which includes a SONET-based digital subscriber loop carrier system that supports wideband and narrowband services. The digital subscriber loop carrier system includes a common module for performing common functions of the system and for transferring subscriber data between the system and a central office or local digital switch, and at least one service definition module, which is coupled to subscribers, for interfacing the subscribers to the system. The common module and the service definition modules are coupled by a common backplane including pulse coded modulation buses and all data, including both subscriber data and control data, are transferred per the SONET protocol. Each of the common module and service definition modules employ buses, which are also based on the SONET protocol.

28 Claims, 16 Drawing Sheets

PROTECTION DROP PD
PROTECTION ADD PA
WORKING DROP WD
WORKING ADD WA

PROTECTION DROP PD
PROTECTION ADD PA
WORKING DROP WD
WORKING ADD WA

DIGITAL LOOP CARRIER SYSTEM

BACKGROUND OF THE INVENTION

The present invention relates to a telecommunication network and more particularly to a SONET-based digital subscriber loop carrier system that supports wideband and narrowband services.

Today, a telecommunication network must support a variety of narrowband and wideband services ranging from plain old telephone service (POTS), DS0, to fiber-to-the-home (FTTH), fiber-to-the-curb (FTTC), and personal communication networks (PCNs). Conventional digital subscriber loop carrier systems are known which can handle such services. However, the architecture of such conventional systems generally employ a piece-meal type arrangement wherein to support each service a specific piece of hardware is provided. In addition, while subscriber data is transferred on one set of buses, control data is transferred on another set of buses independently of the subscriber data, yielding even more hardware and expense. As a result, the system becomes very complicated which, in turn, makes the system unreliable and very difficult to maintain and to fix when problems occurs. Moreover, such complicated conventional systems are very expensive.

SUMMARY OF THE INVENTION

Accordingly, it is an object of the present invention to provide a SONET-based digital subscriber loop carrier system that supports wideband and narrowband services and which is free of the above-mentioned problems.

The above and other objects of the invention are accomplished by a digital subscriber loop carrier system of a telecommunication network having a plurality of subscriber units including a common module, which includes a means for performing common functions of the system and a means for transferring subscriber data between the system and a central location, a service definition module, which is coupled to the subscriber units, for interfacing the subscriber units to the system, and an interface, including pulse coded modulation buses, for interconnecting the common module to the service definition module and for transferring the subscriber data and common control data between the common module and the service definition module via the pulse coded modulation buses based on a common pulse coded modulation frame format.

Further in accordance with the above objects, the present invention provides a digital subscriber loop carrier system of a telecommunication network having a plurality of subscriber units including a common module, the common module comprising means for performing common functions of the system and means for transferring subscriber data between the system and a central location, a plurality of service definition modules, each being coupled to a subset of the subscriber units, for interfacing the subscriber units to the system, and an interface means, including add and drop lines in both working and protection directions configured as a counter-rotating ring, for interconnecting the common module to the plurality of service definition modules and for transferring data between the common module and the service definition module via the add and drop lines based on a SONET STS signal, the data including the subscriber data, common control and signaling data and protection switching protocal data, wherein the common control and signaling data and the protection switching protocol data being transferred in overhead bytes of the SONET STS signal transfer.

Yet, further, the present invention provides a digital subscriber loop carrier system of a telecommunication system including a common module, the common module including means for performing common functions of the system and means for transferring subscriber data between the system and a central location, a plurality of service definition modules, each coupled to subscriber units, for interfacing the subscriber units to the system, and interface means for interconnecting the common module to the plurality of service definition modules in one of a star, ring, or linear add/drop multiplex bus network configuration, and for transferring the subscriber data and common control data between the common module and the service definition modules.

Other features and advantages of the invention will be apparent from the following description of the preferred embodiments, and from the claims.

DETAILED DESCRIPTION OF THE PREFERRED EMBODIMENTS

Referring to the accompanying drawings, preferred embodiments of the present invention will be described in detail.

I DIGITAL LOOP CARRIER SYSTEM

1. OVERVIEW

Figure 1:
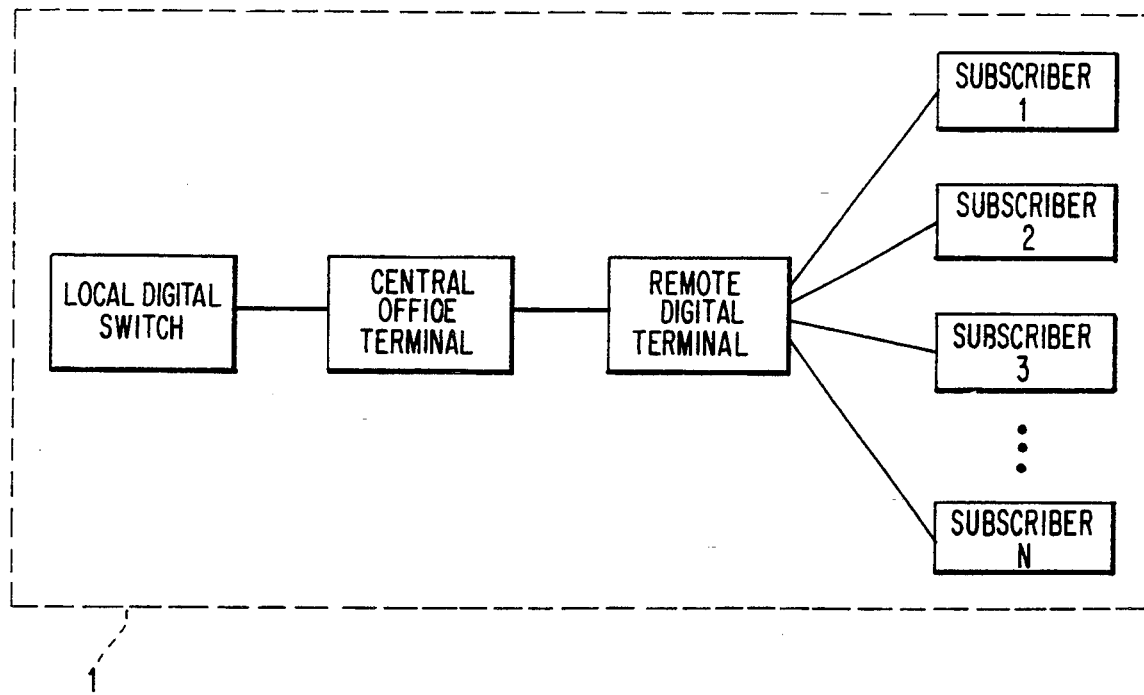
FIG. 1 illustrates a digital loop carrier system of a conventional telephone network.

FIG. 1 shows a digital loop subscriber carrier (DLC) system 1 in accordance with the present invention. The DLC system is compatible with the essential features of BELLCORE TR-TSY-000303 (TR-303), which specify the direct interface for a DLC to a local digital switch. The essential features of TR-303 include 64 kbit/s clear channel capability, SONET (Synchronous Optical NETwork) OC-3 link between a remote digital terminal (RDT) and a local digital switch or central office terminal, ISDN (integrated services digital network) basic rate access, common channel signalling (CCS), bandwidth-on-demand capability, embedded operations channel for OAM&P functions, cross-connect capability for DS0 and SONET virtual tributary (VT) traffic across an entire STS-1 payload, and software architectures and operation support system communications protocols compatible with other BELLCORE technical references.

The DLC system 1 is of a modular architecture and includes a common shelf module 20 connected to at least one, but typically several service definition modules (SDM) 30. The architecture as more fully described below distributes the processing functions between the common shelf module and the SDMs so as to minimize overall system cost and complexity while still providing flexibility of a distributed processing architecture.

The DLC system may be configured for use in a star, ring, or linear add/drop multiplex (ADM) bus networks. The DLC can be used by itself as the focus of a star or as an ADM, or it may interconnect into higher speed stars, rings, and buses based on other products of the assignee, for example, OC-12 and OC-48 multiplex systems.

2. SERVICE DEFINITION MODULE

Figure 2:
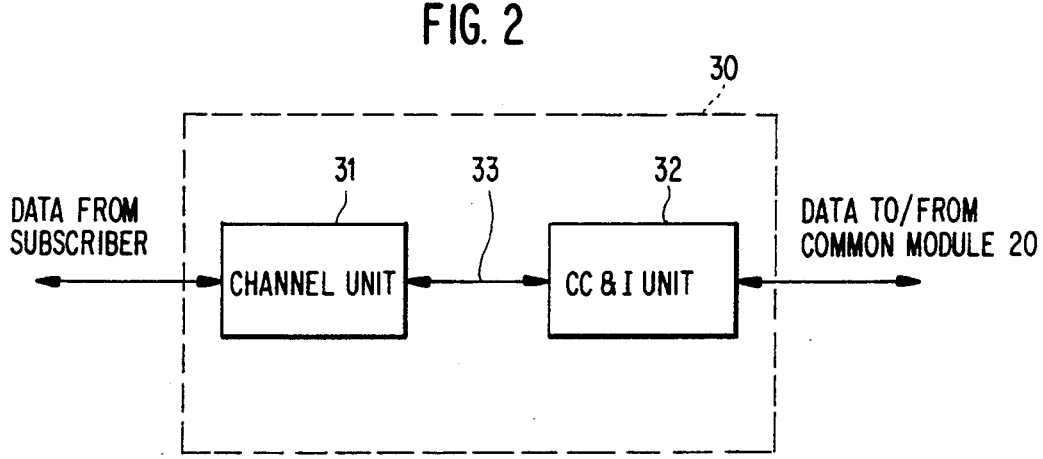
FIG. 2 illustrates a service definition module of a digital loop carrier system in accordance with the present invention.

The SDM 30 provides a direct interface between the subscribers of the communication system and the common module 20. As shown in FIG. 2, the SDM 30 includes a channel unit group 31 and a common control and interface (CC&I) unit 32 for providing a low-speed interface to subscribers and local common control for common channel signaling (CCS) processing, provisioning, and alarm and status monitoring.

Figure 3:
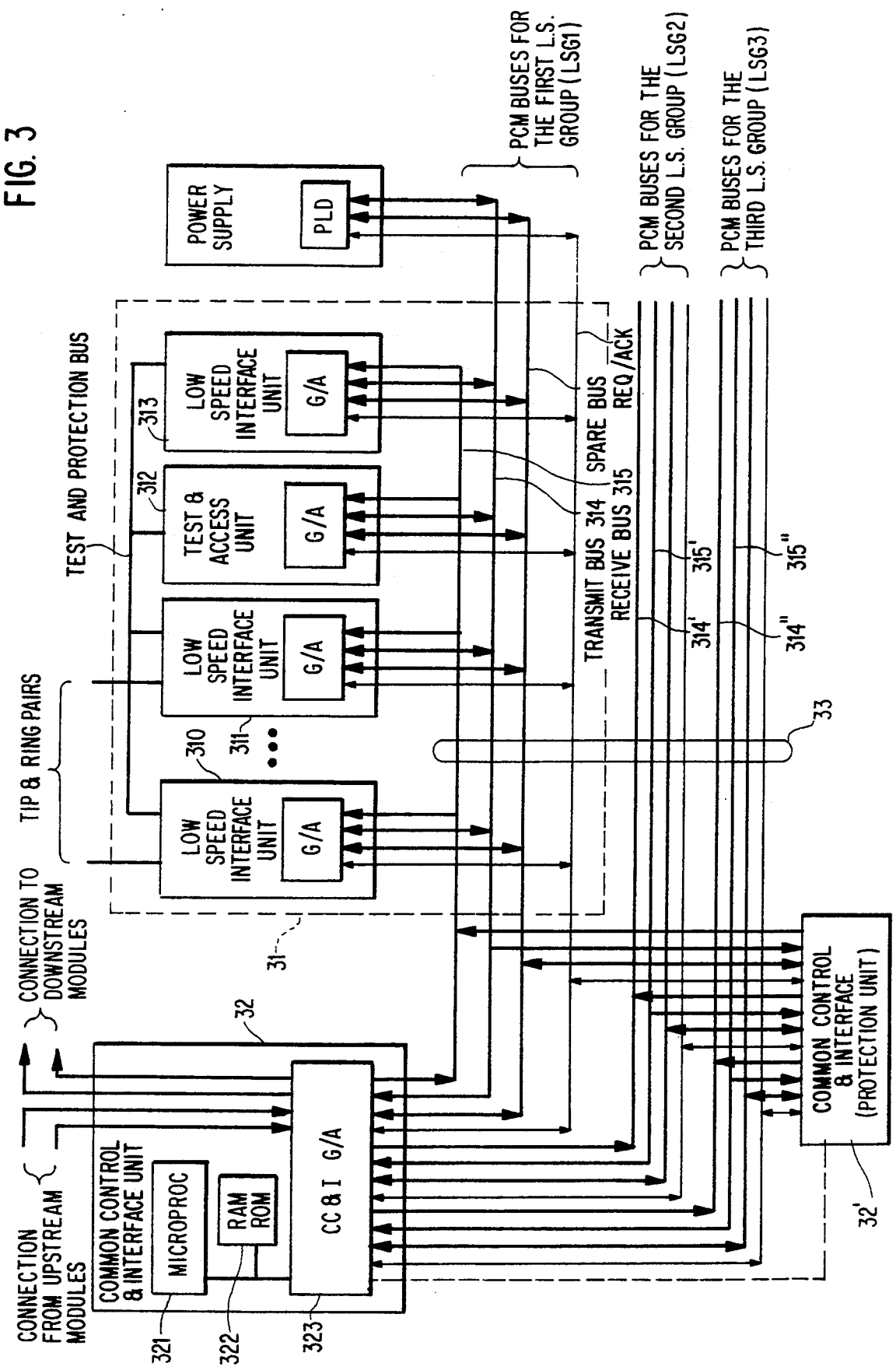
FIG. 3 illustrates a detailed block diagram of the service definition module of FIG. 2.

With reference to FIG. 3, the channel unit group 31 includes low-speed interface units 310 and 311 which interface directly to subscribers. The interface units 310 and 311 support various low speed rates including analog voice frequency (VF) signals such as plain old telephone systems (POTS), DS0, DS1 (including framed and unframed DS1 connections), DS2, DS3, STS-1, OC-1, ethernet (and other medium-speed LANs), fiber-to-the-home (FTTH) and fiber-to-the-curb (FTTC) optical connections, and links to personal communication transceivers.

The DS1 and DS3-rate wideband services may also carry switched multi-megabit data service (SMDS) or frame relay packets. Such wideband packet services may either be transported transparently through a remote digital terminal (RDT) to the central office, or the RDT may optionally perform a packet concentration function. In the case of local area network (LAN) or metropolitan area network (MAN) bridges, the DLC may behave as a node on that LAN or MAN. When data packets arrive which must be transported from that LAN or MAN to another network, the DLC uses either frame-relay, SMDS, or direct (dedicated) connection to transfer the messages to the other network. The bandwidth allocation within the DLC for the bridged data may either be permanently assigned, or may be dynamically requested.

The test & access unit 312 performs self-test and diagnostic on the low-speed interface units. Upon the detection of a fault, a low-speed interface unit 313 may be switched on-line for either of the low-speed interface units 310 or 311 to prevent interruption in service. In sum, all units within the SDM, including POTS units, have redundant units for protection.

The data received by the low-speed interface units 310 and 311 is passed onto a backplane 33 composed of pulse code modulation (PCM) transmit and receive buses 314 and 315. The buses are eight bits or a byte wide arranged in the standard STS-1 format running at 6.48 Mbyte/s, which is the same data capacity as a 51,840 Mbit/s STS-1 signal. The backplane is generic in the sense that it is compatible with or capable of transmitting data of various low speed rates from each of the various types of low speed interface units 310 and 311.

Figure 4:
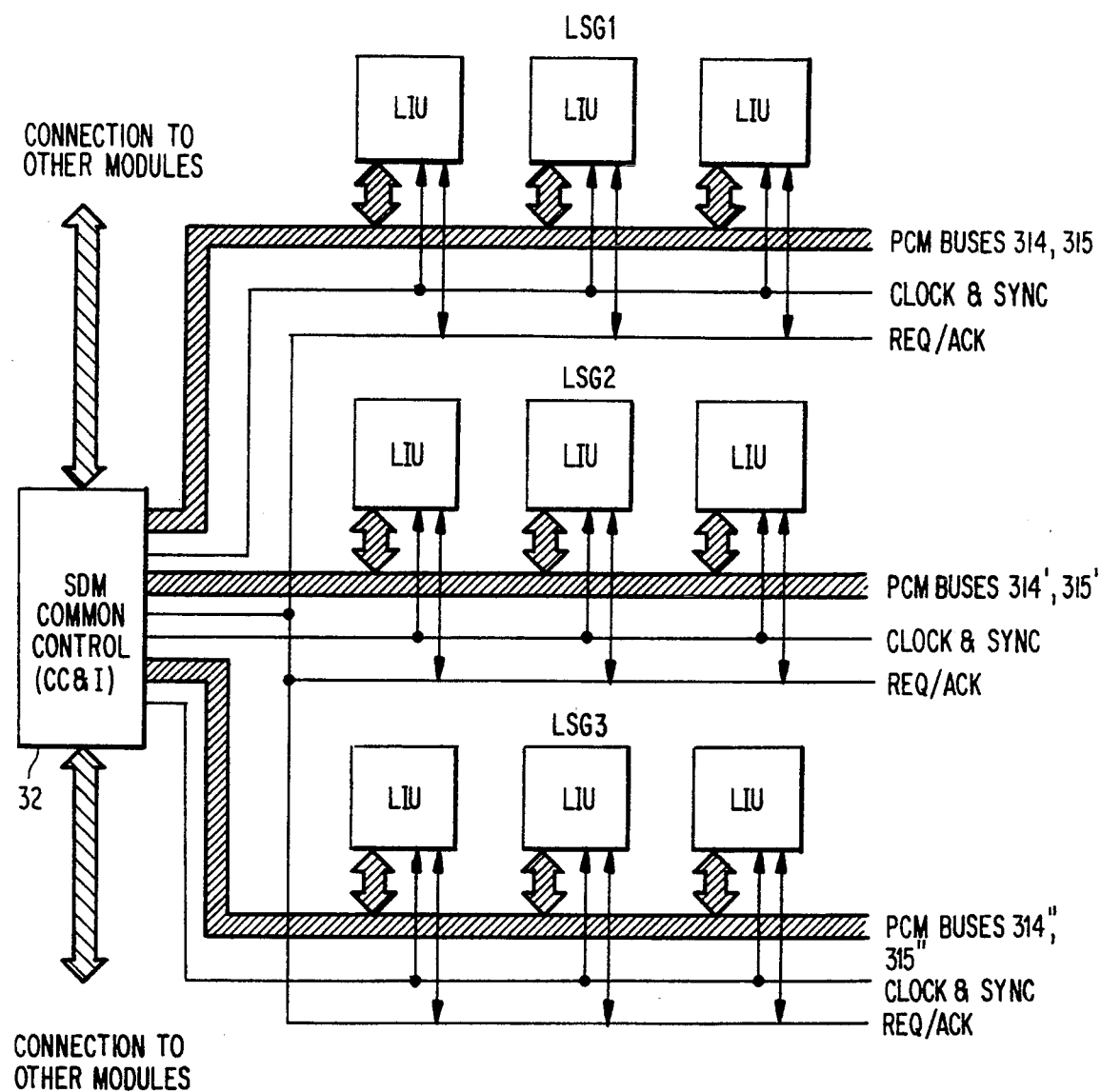
FIG. 4 illustrates the bus structure for the service definition module of FIG. 2.

As shown in FIG. 4, the backplane is physically partitioned into three separate sets of transmit and receive buses, each of which connects to one of at least three low speed interface unit groups LSG1, LSG2, and LSG3. A clock and a sync signal CLOCK SYNC and a request/acknowledge REQ/ACK signal are also supplied to the groups. The backplane partitioning is such that the STS-3 rate signal which interconnects the SDM to the common module 20 (as described below) is partitioned on an STS-1 basis among the low-speed groups. All groups may be connected to the same STS-1 bus, or each group may be connected to different STS-1 buses within the same STS-3 signal. This partitioning capability allows for greater flexibility and efficiency when low-speed interface units of various rates interface to the same SDM. In practice, if the SDM is fully populated with voice frequency low-speed interface units, all three low-speed groups would generally be connected to the same STS-1 bus. On the other hand, if the SDM is fully populated with DS1 interface units, each low speed group would generally be connected to a separate STS-1 bus. The bus partitioning is programmable within the SDM common control & interface (CC&I) unit 32 to provide an easy configuration operation.

In operation, a channel unit group 31 which is servicing a DS0 data link, will output DS0 data onto a STS-1 bus in a predetermined timeslot of the SONET payload. On the other hand, a channel unit group 31 which is servicing a SONET virtual tributaries (VT) link will perform its own VT formatting and VT overhead processing. For example, a DS1 channel unit (i.e., a channel unit servicing a DS1 data link receives incoming DS1 signals, adds the appropriate VT1.5 overhead, and performs all required VT pointer adjustment. For an OC-1 channel unit interface, all data is placed directly onto the backplane in all timeslots except the timeslots corresponding to the line or section overhead. The OC-1 channel unit performs the SPE payload pointer adjustment required to synchronize its STS-1 bus output with the alignment of the STS-1 signals in the common shelf module 20.

The full range of POTS, 2-wire, and 4-wire special service channel units are supported by the DLC for voice frequency interfaces to the subscriber. DS1 and higher-rate services are typically passed transparently through the DLC. In several applications, however, the data is actually processed by the remote digital terminal RDT. These applications include TR-008 conversion (where the DLC RDT acts as a TR-008 central office terminal COT and reformats the data into TR-303 for the connection to the central office), framed DS1 signals carrying fractional DS1 services, frame relay or SMDS links where packet concentration is required, and ISDN-PRI connections to a PABX where further formatting has been requested.

In the case of a LAN or MAN bridge interface, the low-speed interface unit interfaces to the LAN or MAN in its native protocol. For example, IEEE 802.X series. When data packets arrive that are to be routed to a distant LAN or MAN, the low-speed interface unit removes these data packets and arranges for their transport to the other network. The transport between the LANs may be accomplished by direct connections (e.g., dedicated DS1), or by dynamic bandwidth requests. The data packets may be transported in the frame relay or SMDS formats.

The CC&I unit 32 serves to interface the channel unit group 31 with the common module 20° As shown in FIG. 3, on the subscriber side, the CC&I unit 32 interfaces with the three STS-1 buses 33 from each of the three low-speed groups LSG1, LSG2, and LSG3. The CC&I unit combines the data from the three STS-1 buses and outputs the data on the STS-3 bus to the common module 20.

The CC&I unit 32 includes a microprocessor 321 and a RAM/ROM storage 322 for providing a status function for polling for alarm conditions, arbitration for alarm conditions, processes messages (data packets) from the channel unit (e.g., off-hook, ringing), converts to a standard packet, message translations, mapping or address translation to physical connection of subscribers.

The SDM further includes a CC&I protection unit 32', which is redundant to the CC&I working unit 32, for monitoring and detecting errors in the working unit 32 and on the buses 33. Upon the detection of an error on one of the buses, the protection unit 32' will switch the spare bus for the faulted bus. On the other hand, upon the working unit 32 failing, the CC&I protection unit 32' will be switched on-line in place of the working unit 32.

3. COMMON SHELF MODULE

A. GENERAL

The common shelf module 20 provides the interface to the central office terminal and performs common functions of the DLC, such as time slot interchange functions across a PCM payload, CCS processing, EOC (embedded operation channel) processing, high-speed optical interface (either directly to the LDS or to a multiplex-derived network which connects to the LDS), processing of the SONET data communications channels (DCCs), SONET multiplexing and demultiplexing, system clock and synchronization derivation, integrating other high-speed inputs (e.g., FDDI signals), and system common control.

Figure 5:
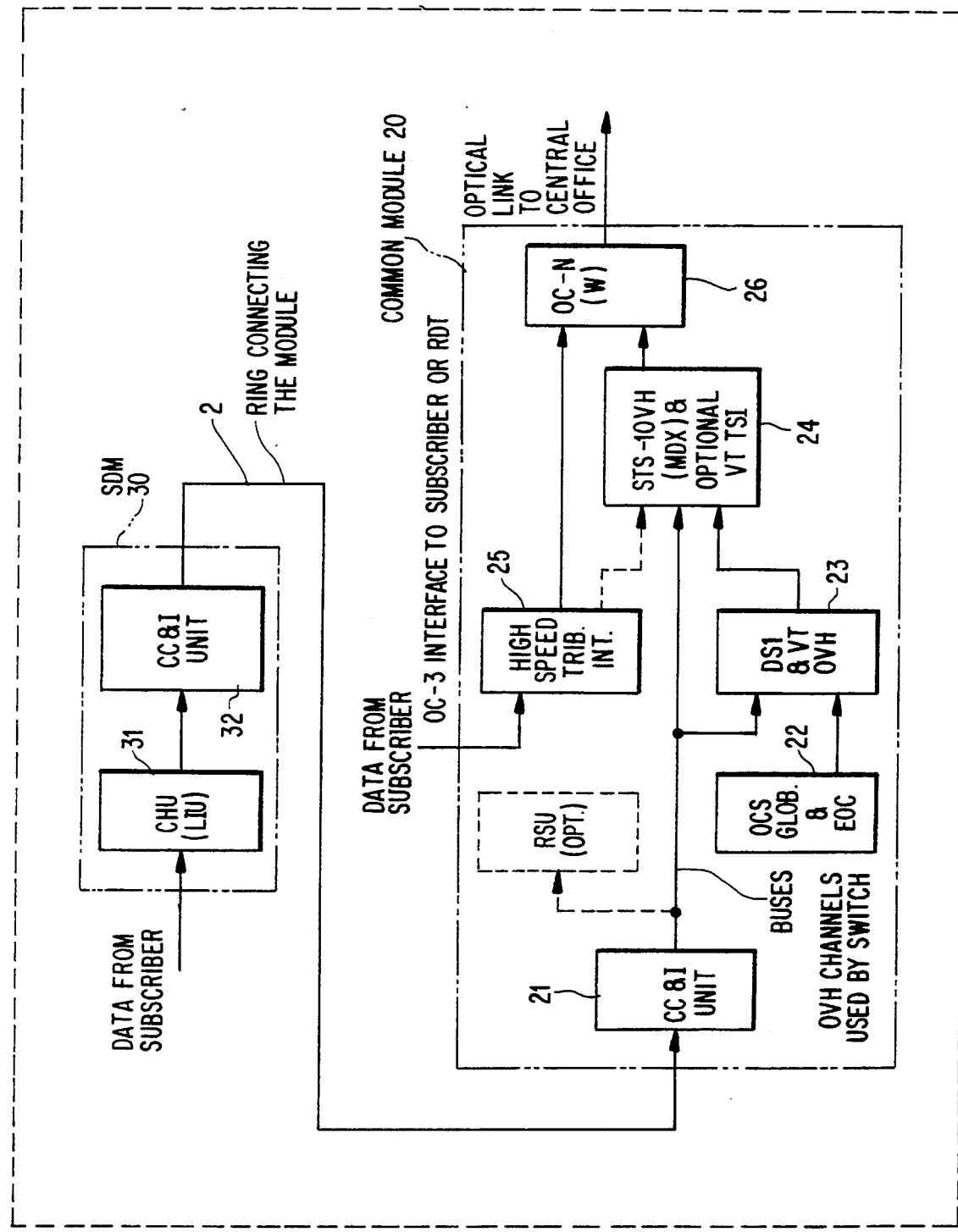
FIG. 5 illustrates the service definition module of FIG. 2 and a common module of the digital loop carrier system in accordance with the present invention.
Figure 6A:
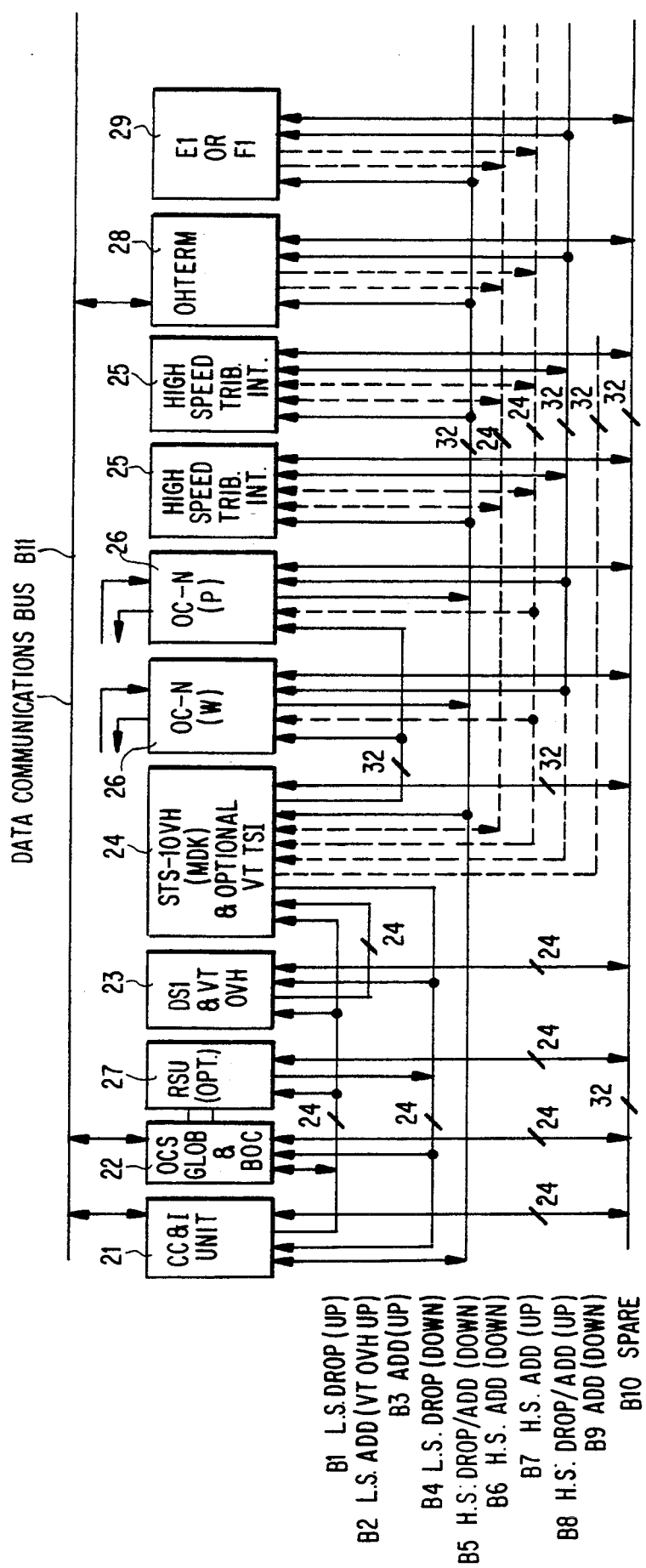
FIGS. 6(a)-(d) illustrate the digital loop carrier system of the present invention in a line terminating equipment configuration.
Figure 6B:
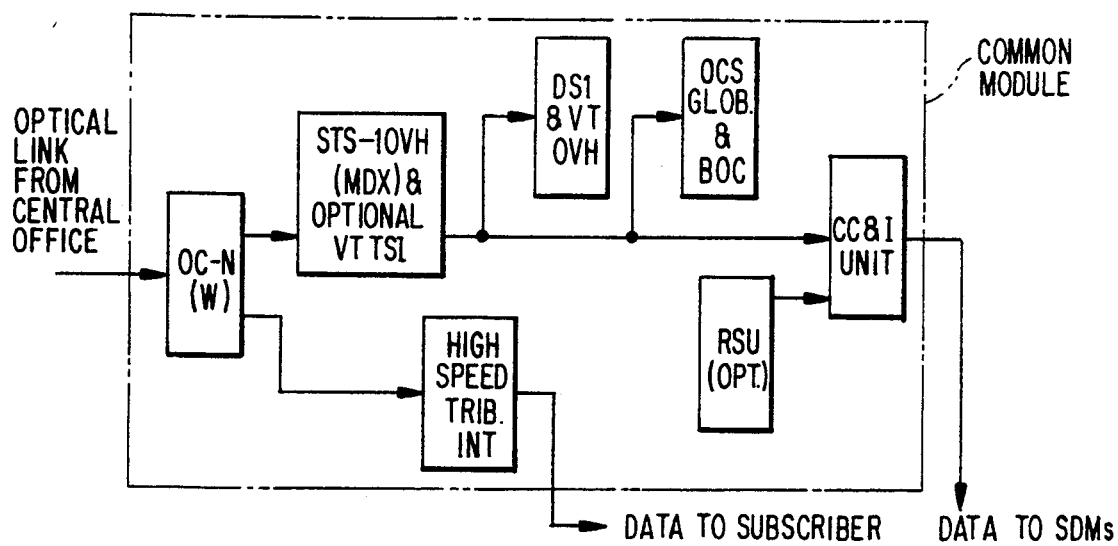
Figure 6C:
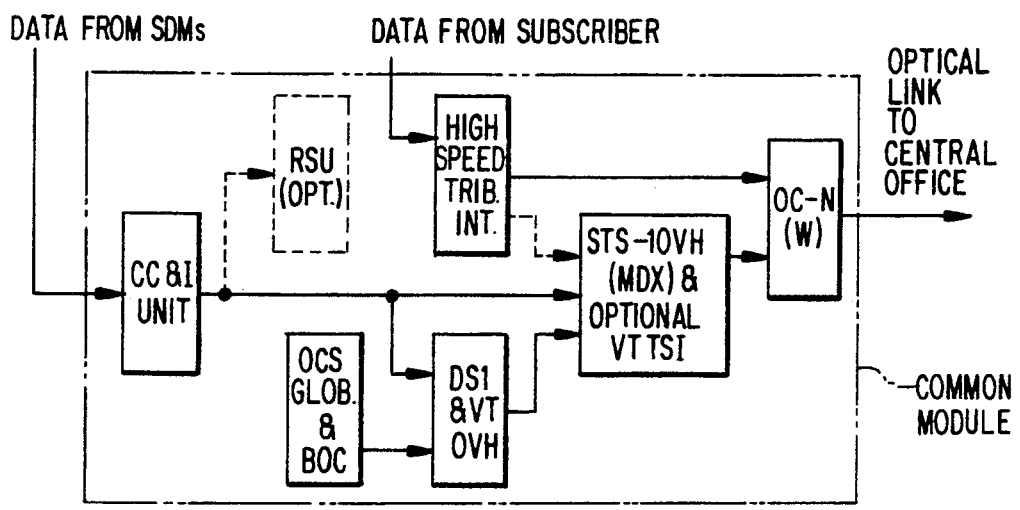
Figure 6D:
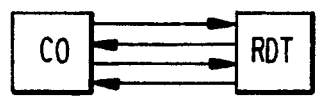

Referring to FIG. 5, the common shelf module 20 includes a common module common control and interface 21, a CCS global & EOC unit 22, a DS1 & VT overhead unit 23, a STS-1 overhead (MDX) & optional VT TSI unit 24, a high speed tributary interface unit 25, and a primary optical interface unit 26, which are variously interconnected by ten PCM data buses, which are described in more detail below.

B. COMMON MODULE COMMON CONTROL AND INTERFACE UNIT 21

The common module common control and interface (CC&I) unit 21 serves to process and act on messages received over the SONET data communication channel in the SONET overhead that are intended for that network element, gather and record all system alarm and status information, format all messages to be sent to other network elements or operation support systems (e.g., network database computers used by operating companies), and initiate appropriate fault correction actions within the common module (e.g., protection switching).

The complete system status database, which stores data relating to, for example, alarm and status information, time slot assignments for all of the PCM timeslots, etc., resides in the common module CC&I unit and a redundant copy of the database is stored within a redundant common module CC&I unit. The system map is accessible remotely over the backplane interface by the CCS global & EOC unit 22.

Software and firmware for the common module CC&I unit are downloaded through a port in the common module via a modem or a direct link to a remotely located computer (e.g., personal computer).

The system controller is protected with a hot-standby redundant unit, which will be switched on-line and take over control of the system when the primary unit is determined to have a fault.

C. COMMON CHANNEL SIGNALING GLOBAL & EMBEDDED OPERATION CHANNEL UNIT 22

The CCS global & EOC processing unit 22 performs the embedded operations channel (EOC) processing for either the TR-303 or TR-008 standard interface. In the case of the TR-303 standard interface, this unit 22 performs the Layer 2 (LAPD - Link Access Protocal for Data channel) and layer 3 (routing) processing for the common channel signalling (CCS) and time slot management channel (TMC). The CCS global & EOC unit 22 processing unit processes all of the EOC and CCS channels that are associate with channels that originate on DLC. Since the time slot management channel (TMC) messages are a subset of CCS messages, the TMC messages are treated in the same manner as the CCS messages.

The CCS data link layer must be fully terminated on the CCS global & EOC processing unit 22. Once the data link layer has been removed, the unit 22 then formats the CCS messages, and translates the address to that of the destination SDM and low-speed interface unit. The information field of these will not be altered by the CCS global & EOC processing unit 22, although the unit may perform parsing functions on some of the messages. The messages are routed to the appropriate service definition module by way of the common module CC&I unit 21. Additional necessary message processing is performed within the service definition module, and is typically performed by the destination low-speed interface unit.

In the transmit direction (from the RDT to the IDT or central office), the messages that originates in the low-speed interface units are received by the CCS/EOC controller and reformatted. The data is placed into a LAPD frame inserted into the appropriate CCS time slot.

The EOC is fully terminated by the CCS global & EOC processing unit because it handles messages generally involving the entire STS-1 group of maintenance functions. Messages are passed to and from the common module CC&I unit 21 which interprets the message, and performs accordingly. Messages intended to control testing and provisioning functions will be communicated to the service definition modules or low-speed interface units. The internal messages may use a format other than that used over the EOC.

D. DS1 AND VT OVERHEAD PROCESSING 23

The DS1 and VT overhead processing unit 23 is used when the service definition module's low-speed interface units are handling traffic of a sub-DS1 bit rate (e.g., POTS or ISDN-BRI). In these applications, the DS1 & VT overhead unit 23 inserts the appropriate DS1 and VT overhead bits, including the DS1 periodic performance reports, into the outgoing bit stream. For incoming data, the unit processes the incoming DS1 and VT overhead, including the framing, and DS1 and VT performance monitoring. The unit processes the data for all DS1s and all VTs of the three STS-1 signals from the SDMs.

As previously described, in the case where an SDM low-speed interface unit provides DS1, DS2, or 2.048 MBit/s (E1) interfaces, that low-speed interface unit is responsible for performing all overhead processing associated with the DS1, DS2, E1 and VT overhead.

E. STS-1 OVERHEAD MULTIPLEX/DEMULTIPLEX & OPTIONAL TIME SLOT INTERCHANGE (TSI) 24

The multiplex and demultiplex functions for the STS-1 signals are performed in the STS-1 overhead (MDX) & optional VT TSI unit 24 in the common module. This unit performs all processing associated with the STS-1 path overhead (e.g., error check and payload signal label), and interfaces with the primary optical interface unit 26 to perform pointer alignment functions.

In applications where full VT TSI is required, optional VT TSI unit provides cross-connect functions. Specifically, the unit performs any required VT pointer processing on incoming VTs, performs the cross-connect functions (including inserting the new VT pointer data), and adds the appropriate STS-1 path overhead to the resulting STS-1 signals.

For STS-1 path overhead processing, the unit 24 handles up to three STS-1 signals. For complete VT TSI processing, when the primary optical interface is an OC-12, the unit 24 handles the STS-1 path overhead for twelve STS-1 signals.

In a path protected ring network application, the unit 24 monitors the VT Path overhead for the VTs dropped at the RDT. For example, in path-switched, uni-directional ring applications, the STS-1 overhead (MDX) & optional VT TSI unit 24 performs the path performance monitoring for the data received from both directions around the ring. The best of the two paths is chosen for each path pairs monitored, and a single signal is formed from the chosen paths to be passed to the SDMs.

F. PRIMARY OPTICAL INTERFACE 26

The primary optical unit 26 interfaces the common module to an integrated digital terminal (IDT) or a central office terminal (COT), either directly, or through a multiplex-derived transmission network. The primary optical interface is an OC-3 signal, although for future upgradeability the bandwidth of the optical interface can be increased to an OC-12 signal. The optical interface for either the OC-3 or OC-12 interfaces meet all of the requirements described in ANSI T1.106.

If the common module is connected to a higher rate SONET multiplex equipment at the same location, then an electrical STS-3 interface will be provided as the primary interface instead of an OC-3. The STS-3 signal will conform to the requirements specified in ANSI T1.102a.

The primary optical or electrical interface is protected with 1:1 protection.

The primary optical unit 26 also serves to insert line and section overhead for the transmitted signal and process portions of the line and section overhead for the received signal. In the case of data communications, orderwire, and user data channels, the data is passed onto other units, such as OHTERM 28 and E1/F1 29 units, for actual termination. The primary optical unit further serves to process framing, BIP8, and APS bytes and pointer bytes. The byteinter-leaved multiplex and demultiplex functions between an STS-1 and STS-N signals are also performed by this unit.

G. HIGH SPEED INTERFACE UNIT 25

The high speed tributary interface unit 25 provides an high-speed (i.e., greater than DS1 bit rate) to the primary OC-N 26 and provides a high speed (i.e., greater than DS3 bit rate) interface to the subscriber.

G. REMOTE SWITCH UNIT 27

The remote switch unit 27 is an optional unit which is used for emergency stand-alone switching operation of an RDT. In this mode, the common module is capable of providing telephone connections between any of the subscribers subtending from that RDT.

H. CLOCK UNIT

The clock unit derives the system clock from either the incoming primary optical signal, an external reference signal, or, in case of an external clock reference failure, from its own internal clock.

I. BUSES

Referring to FIGS. 6(a), 7(a), 8(a), and 9(a), three of the ten buses B1 to B10 are used specifically in the portion of the common module 20 that process data associated with the SDMs, five buses are used for high speed subscriber interfaces to the common module, one bus is common to both low- and high-speed portions, and one bus serves as a spare bus. When the primary optical interface to the common module is configured an OC-3 interface, all buses operate at a bus width of 24 bits and a clock rate of 6.48 MHz. When the primary optical interface is an OC-12 interface, the buses associated with the high-speed interfaces use a bus width of 32 bits for drop buses, 24 bits for add buses, and a clock rate of 19.44 MHz. By keeping the bus rates under 20 MHz, TTL tri-state compatible drivers can be used for all bus rates. With respect to OC-3 application, the high-speed interface buses use the 24 least significant bits (LSBs) of the 32-bit buses.

As shown in FIGS. 6–9, the ten PCM buses include:
1. A low-Speed Upstream Drop (LSUD) bus B1 which passes data from the SDM interface and CCS global & EOC processing unit 22 to the DS1 & VT overhead unit 23, and STS-1 overhead (MDX) & optional VT TSI unit 24.
2. A low-Speed Upstream Add with VT Overhead (LSUA) bus B2 which transfers data from the DS1 & VT overhead unit 23 to the STS1 1 overhead (MDX) & optional VT TSI unit 24;

3. An add Upstream (AU) bus B3 which passes data from the STS-1 overhead (MDX) & optional VT TSI unit 24 to the primary OC-N unit 26;
4. A low-Speed Downstream Drop (LSDD) bus B4 which carries data from the STS-1 overhead (MDX) & optional VT TSI unit 24 to units 21, 22, 23, and 24;
5. A high-Speed Downstream Drop (HSDD) bus B5 which carries data from the primary OC-N unit 26 to the other high-speed interface units 25. (In some cases, other high-speed interface units may add STS-1 data to this bus);
6. A high-Speed Downstream Add (HSDA) bus B6 which carries data from the high-speed interface unit 25 or STS-1 overhead (MDX) & optional VT TSI unit 24 to the downstream OC-N unit 26. This bus is primarily used in linear ADM applications;
7. A high-Speed Upstream Add (HSUA) bus B7 generally carries upstream data from the high-speed interface unit 25 to the other primary OC-N unit that interfaces on the downstream side of an ADM or opposite ring direction. This bus is primarily used in linear ADM and ring applications;
8. A high-Speed Upstream Drop (HSUD) bus B8 carries data from the downstream primary OC-N units 26 to the high-speed interface unit 25. (In some cases, other high-speed interface units may add STS-1 data to this bus);
9. An add Downstream (AD) bus B9 which passes data from the STS-1 overhead (MDX) & optional VT TSI unit 24 to the downstream OC-N unit 26; and
10. A spare (Spare) bus B10 which is the redundant bus used as a protection for the other nine buses.

Much of the common control and system overhead data is passed on the LSDD or HSDD buses B4 and B5 in timeslots corresponding to the SONET line and section overhead. Each of the units use one of these two buses for the purposes of passing intra-module overhead data. The bus protocol is the same as that used for transferring data in the SDM.

The LSUD and LSUA buses are arranged to allow modularity in the common module such that there is no need to have circuits in the system unless they are required for processing the data originating or terminating in that system. The circuits for the various functions are also partitioned onto individual units such that functions that are only needed in a subset of applications are confined to a unit that can be removed when that specific function is not required. For example, if there is no sub-DS1 rate data originating in the SDMs, then the circuits on the CCS global and DS1 and VT OVH units are not required. Similarly, for cases where the SDMs generate DS0 data with no common signaling, the circuits of the DS1 and VT OVH unit are required, but the circuits of the CCS Global unit are not. This bus arrangement and functional partitioning between units allows the system to function without these unnecessary units. Other partitioning and bus arrangement would require units to be present and thus the system would include unnecessary circuits.

In addition to the PCM 32-bit data buses, there is a data communications bus B11 that is shared by the system controller, the CCS global & EOC processing unit, the SONET DCC overhead termination unit, and the network interface unit. The data communications bus is a 32-bit wide data path, which supports multi-processor communications, is capable of functioning when only a subset of these units is present, has at least 8 MByte/s throughput, requires no active components or jumpers on the backplane or access from the rear, is capable of hot-card insertion, and is of a standard bus architecture supported by outside vendors.

FIGS. 6–9 also illustrate various network configurations. Specifically, FIG. 6(d) illustrates a line terminating equipment (LTE) configuration wherein the RDT is coupled to the central office (CO). FIGS. 6(b) and 6(c) illustrate the data flow for downstream and upstream communication, respectively, within the LTE network configuration.

Figure 7A:
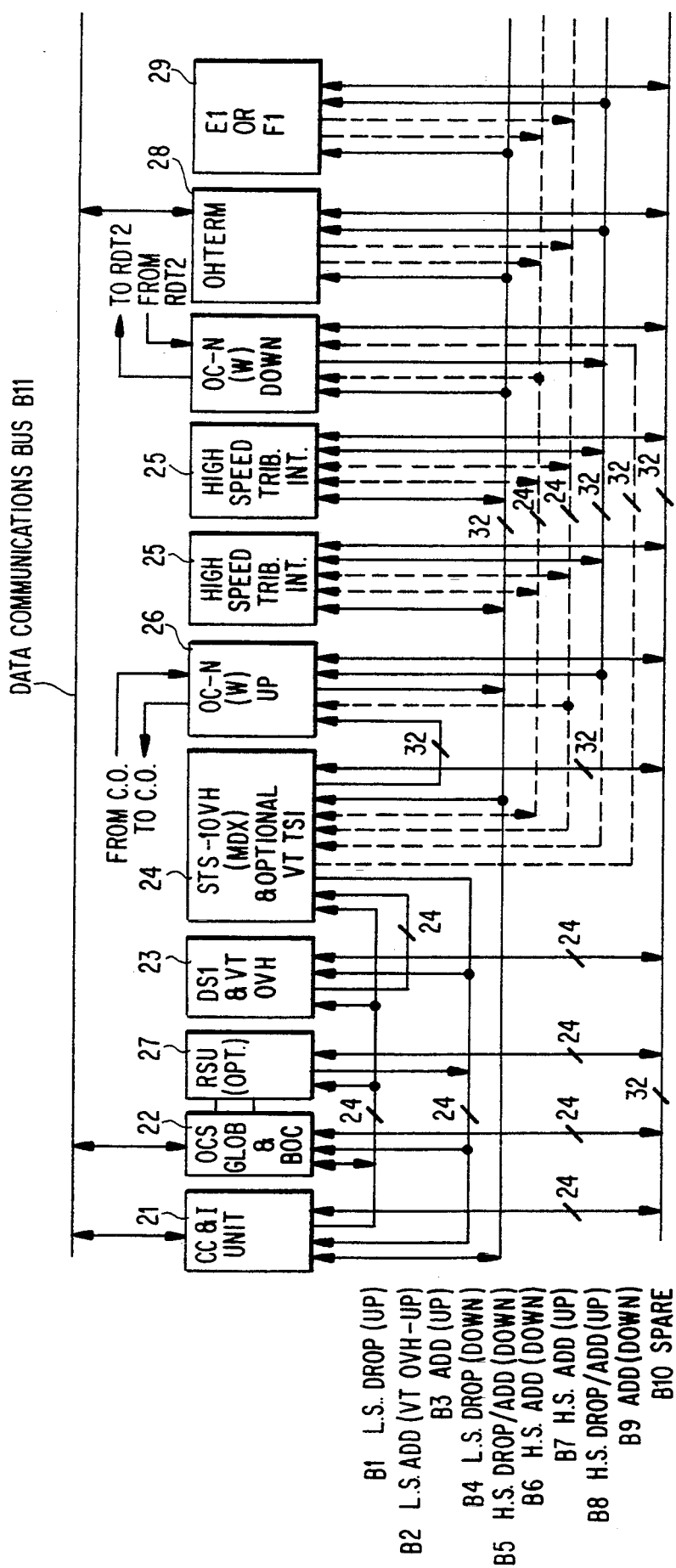
FIGS. 7(a)-(d) illustrate the digital loop carrier system of the present invention in a linear add/drop multiplex configuration.
Figure 7B:
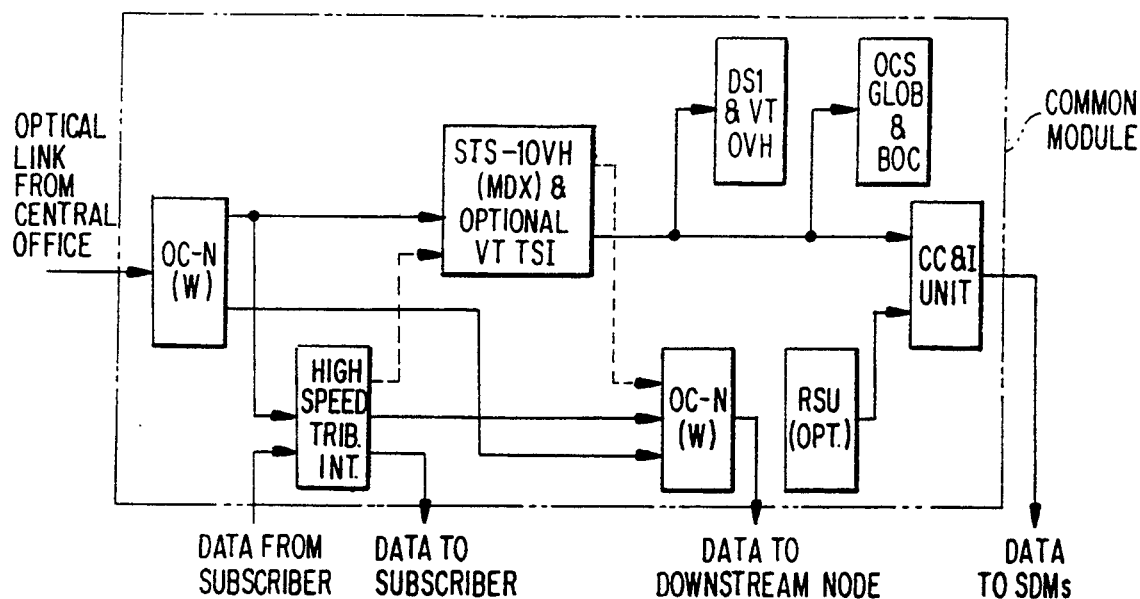
Figure 7C:
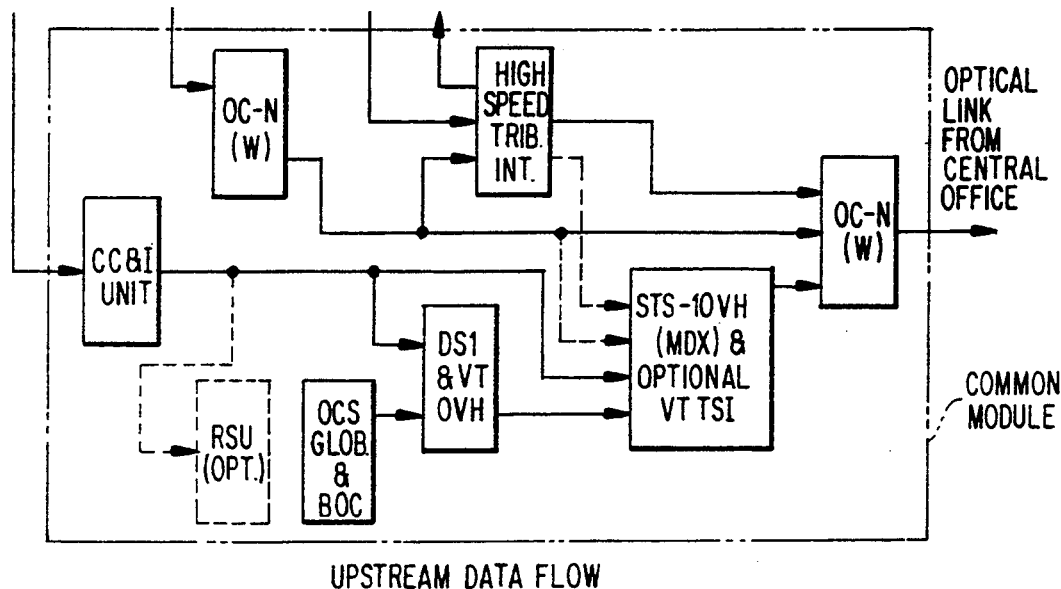
Figure 7D:

FIG. 7(d) illustrates another configuration, namely, a linear add/drop, wherein multiple RDT's (e.g., RDT1 and RDT2) are coupled in series to a CO. FIGS. 7(b) and 7(c) show the data flow for downstream and upstream data communication within the linear ADM network configuration.

Figure 8A:
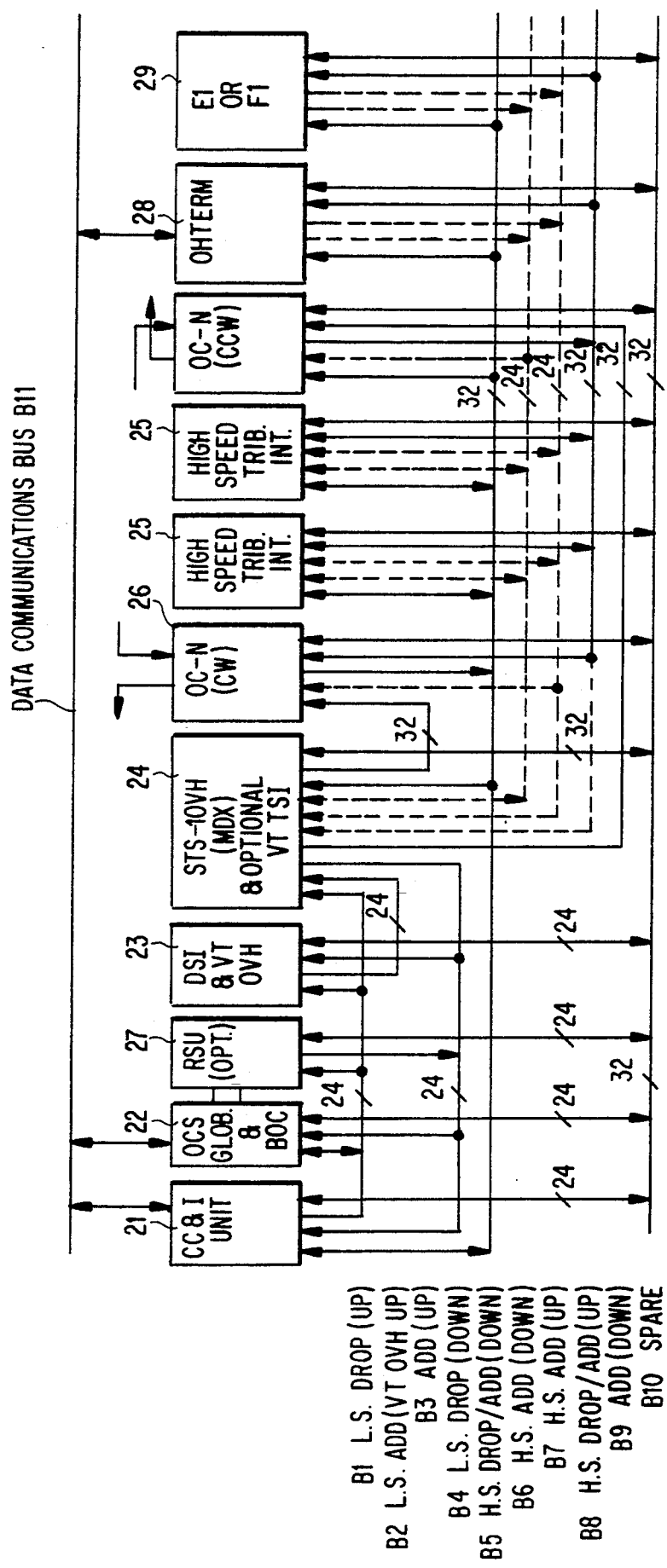
FIGS. 8(a)-(d) illustrate the digital loop carrier system of the present invention in a ring configuration with shared protection, bi-directional ring communication.
Figure 8B:
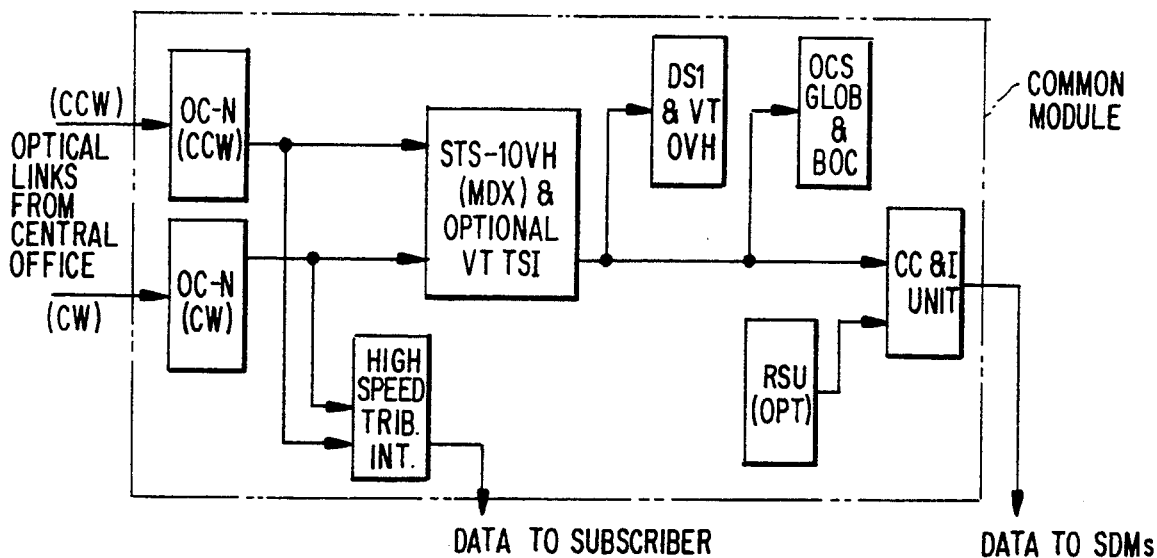
Figure 8C:
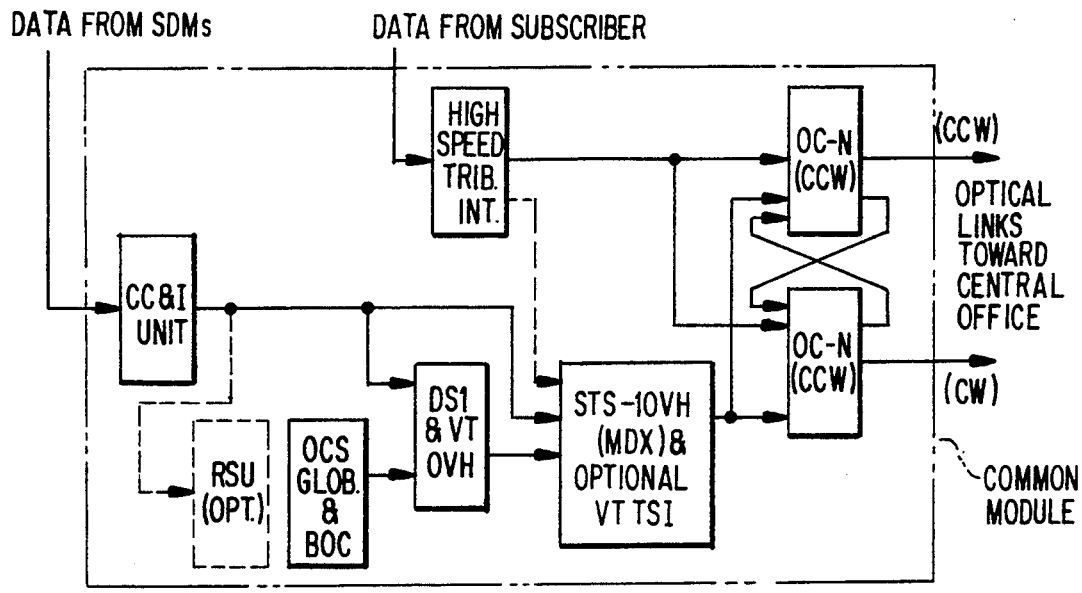
Figure 8D:
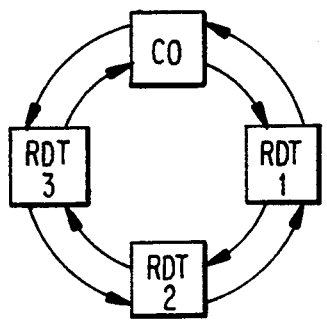
Figure 9A:
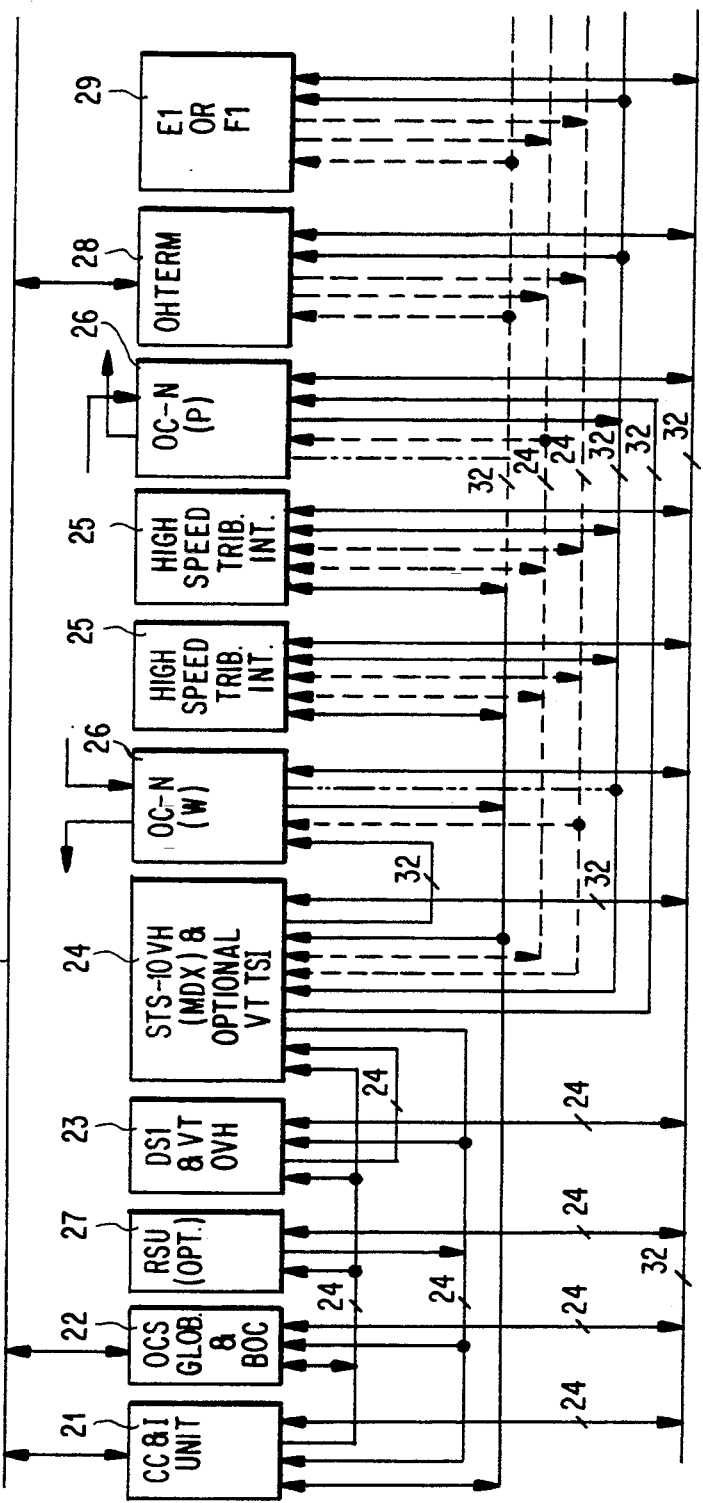
FIGS. 9(a)-(d) illustrate the digital loop carrier system of the present invention in a ring configuration with path-switched, uni-directional ring communication.
Figure 9B:
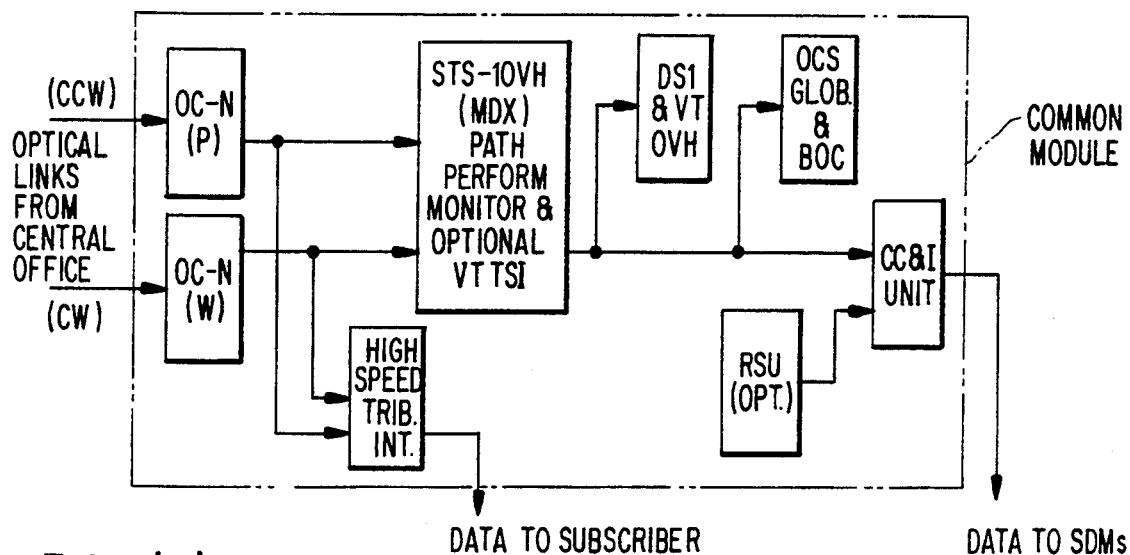
Figure 9C:
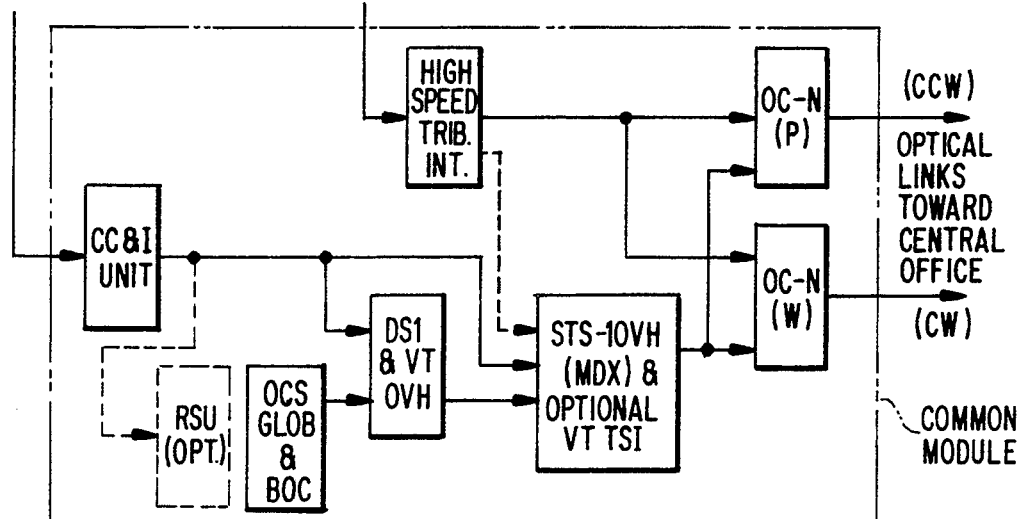
Figure 9D:
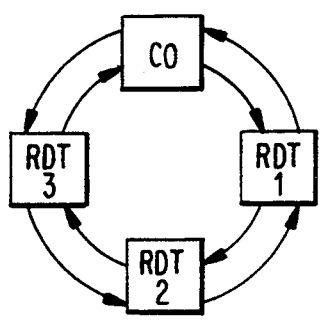

FIG. 8(d) illustrates yet another network configuration, i.e., a ring configuration with shared protection, bi-directional, while FIG. 9(d) illustrates a ring configuration with path-switched, uni-direction communication. FIGS. 8(b), 8(c), 9(b), and 9(c) then show the respective data flow for downstream and upstream communication.

4. INTERCONNECTION BETWEEN THE COMMON MODULE AND THE SDM'S

Figure 11:
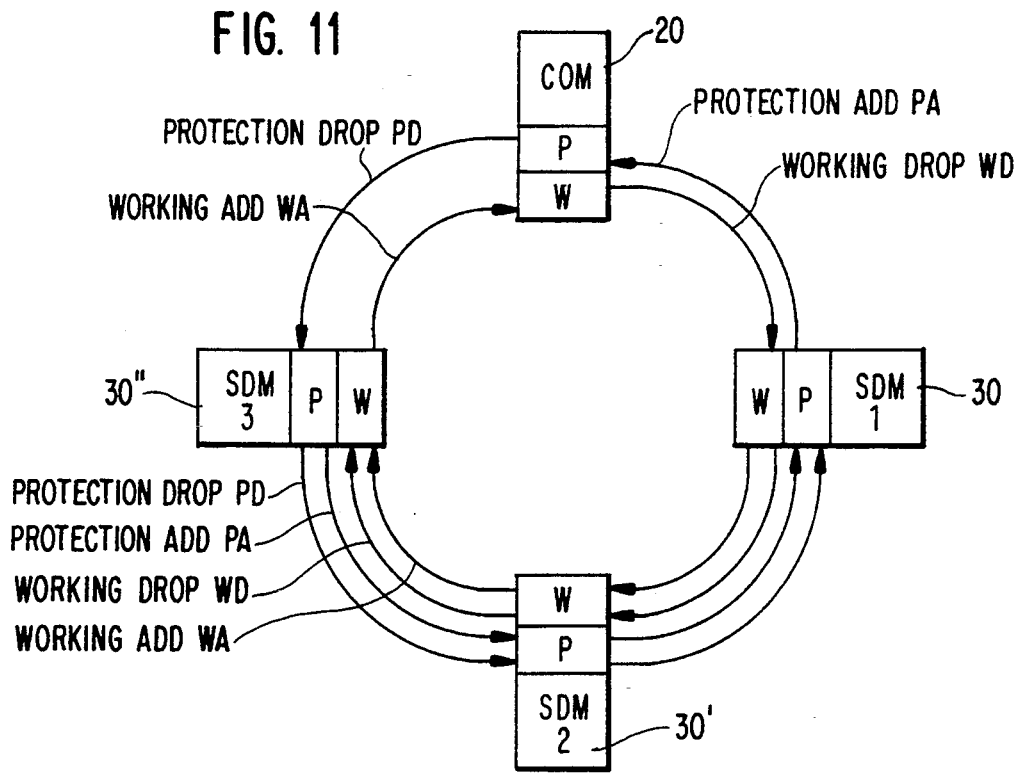
FIG. 11 illustrates a counter-rotating ring configuration of the service definition modules and common modules.

The common shelf module 20 is connected to the service definition modules 30, 30' and 30" using a counter-rotating ring configuration with add and drop lines in both the working and protection directions, as shown in FIG. 11. The interconnection has a signal bus bandwidth equal to 155.520 Mbit/s (STS-3 rate). If additional bandwidth is required by an SDM, the interconnection can be changed to a 622.080 Mbit/s (STS-12 rate); this latter bandwidth will provide for further upgrades.

Physically, the interconnection 2 (FIG. 5) includes three 51.84 Mbit/s (STS-1 rate) signal buses yielding a STS-3 rate bandwidth, a 51.84 MHz clock, and a frame synchronization signal. The three STS-1 rate signals are frame-locked such that their overhead bytes are aligned. However, the majority of the section and line overhead data bytes are redefined and used for internal system communication and a simplified protection switching protocol instead of their standard usage. While more buffering is required with a 3-bit data bus than for a single bit bus, the 51.84 Mbit/s data rate may be processed in a CMOS gate array.

As stated above, the interconnection uses a counter-rotating ring architecture which protects against interconnecting cable failures, transmitter or receiver failures on the interconnecting signals, and total module failures. Because of this capability, it is possible to add new service definition modules to the DLC on an in-service basis. The use of add and drop buses allows the flexibility of assigning timeslots to different low speed interface units in the transmit and receive directions. Such capability is useful in broadcast applications, and in applications where a low speed signal in one direction is used to control a higher speed signal in the other direction (e.g., the control channel for selecting video signals).

Specifically, with reference to TABLE 1, the E1, E2, and F1 bytes of the second and third STS-1 signals, and the A2, C1, B1, D1-D3, B2, K1, K2, D4-D12, Z1 and Z2 bytes of the first, second, and third STS-1 signals are combined to form a single data link for system overhead data traffic. The resulting data link bandwidth is 4.224 Mbit/s in each direction around the ring for a total bandwidth of 8.448 Mbit/s. The A1 byte of first, second, and third STS-1 signals are used for ring protection switching commands, source identification, and parity, respectively. The E1, E2, and F1 bytes of the first STS-1 signal are used for orderwire and user data transmission. The H1, H2 and H3 bytes carry STS-SPE pointer information.

TABLE 1

| 270 BYTES | | | | | | | | |
|---|---|---|---|---|---|---|---|---|
| A1-1 | A1-2 | A103 | A2-1 | A202 | A203 | C1-1 | C1-2 | C1-3 |
| B1-1 | B1-2 | B1-3 | E1-1 | E1-2 | E1-3 | F1-1 | F1-2 | F1-3 |
| D1-1 | D1-2 | D1-3 | D2-1 | D2-2 | D2-3 | D3-1 | D3-2 | D3-3 |
| H1-1 | H1-2 | H1-3 | H2-1 | H2-2 | H2-3 | H3-1 | H3-2 | H3-3 |
| B2-1 | B2-2 | B2-3 | K1-1 | K1-2 | K1-3 | K2-1 | K2-2 | K2-3 |
| D4-1 | D4-2 | D4-2 | D-1 | D5-2 | D5-3 | D6-1 | D6-2 | D6-3 |
| D7-1 | D7-2 | D7-3 | D8-1 | D8-2 | D8-3 | D9-1 | D9-2 | D9-3 |
| D10-1 | D10-2 | D10-3 | D11-1 | D11-2 | D11-3 | D12-1 | D12-2 | D12-3 |
| Z1-1 | Z1-2 | Z1-3 | Z2-1 | Z2-2 | Z2-3 | E2-1 | E2-2 | E2-3 |

TABLE 1 shows byte locations for an STS-3 signal. The unlabeled boxes contain the SONET SPE. The Ai-1 byte carries the protection switching status and commands; A1-2 byte carries a signal source identification; A1-3 byte carries a BIP-8 code for the entire signal; El-1 byte and E2-1 are reserved for orderwise data; Fi-1 byte is reserved; Hi-1, H1-2, H1-3, H2-1, H2-2, H2-3, H3-1, H3-2, and H3-3 bytes are reserved for future use. The CI-1, C1-2, C1-3, BI-1, B1-2, B1-3, El-2, El-3, F1-2, F1-3, Di-1, D1-2, D1-3, D2-1, D2-2, D2-3, D3-1, D3-2, D3-3, B2-1, B2-2, B2-3, Ki-1, K1-2, K1-3, K2-1, K2-2, K2-3, D4-1, D4-2, D4-3, D5-1, D5-2, D5-3, D6-1, D6-2, D6-3, D7-1. D7-2. D7-3, D8-1, D8-2, D8-3, D9-1, D9-2, D9-3, D10-1, D10-2, D10-3, D11-1, D11-2, D11-3, D12-1, D12-2, D12-3, Zi-1, Z1-2, Z1-3, 22-1, Z2-2, Z2-3, E2-2, and E2-3 bytes form an intermodule system overhead data link of 4.224 Mbit/s.

Buffers are required within the SDM CC&I unit 32 and the common module CC&I unit 21 to align the backplanes with the intermodule data in such a manner that hitless protection switching may be performed.

The system data link (i.e., between the common module and SDM) protocol follows that of IEEE P802.6 Distributed Queue, Dual Bus (DQDB). The only variation on IEEE P802.6 is the length of the slots for packet transmission. Since there are 66 overhead bytes available in each SONET frame for the data link, a cell slot size of 33 or 66 are more appropriate than the 53-byte cell chosen for B-ISDN ATM applications. (Note that it is also possible to use the IEEE 302.5 Token Ring protocol. However, because the throughput of a token ring decreases as the load increases, it is advantageous to the use the IEEE P802.6 protocol in this application.)

The working lines WD and WA provide one of the two buses of the DQDB, and the protection lines PD and PA provide the bus in the opposite direction. In normal operation, the common module acts as the head end for both buses; the head end function being reassigned whenever a fault is detected on one of the buses following the protocol of IEEE P802.6. The reassignment of the head end role is also discussed below in the protection switching action section.

Each of the SDMs 30, 30' and 30" determines its own address on the ring based on the incoming A1 Byte of the second STS-1 signal. This source identification byte is set to a binary value of 0000 0000 by the common module as it is transmitted in both the working and protection directions of the ring. Each of the modules examines the identification byte as it is received, and modifies the byte according to a simple algorithm before passing the byte on to the next downstream module. The byte modification algorithm is described below.

A given SDM's address is equal to the value that it places onto the source identification byte after the byte is modified and output onto the working direction bus. (Alternatively, the source identification byte value could be mapped to another address number. This arrangement, for example, would allow the module addresses to correspond to the number of modules between the module and the common module on the ring.) While the algorithm is also performed in the protection direction, this direction is ignored for the purposes of determining the module's address. A majority-vote scheme is used in determining the actual value of the module's address. For example, a module will only adopt a new address value if the incoming source identification byte contains the same new value for at least four consecutive frames.

The source identification byte is modified as it passes through the node according to the following algorithm. The modification circuit is initialized such that it places a leading "1" ahead of the byte. Whenever a "11" is detected on the incoming serial data stream, the value of those two bits is changed to a "10" before the data is transmitted to the next downstream module. Likewise, each incoming "10" pattern is changed to a "11" prior to retransmission. The protocol thus meets the requirements for only two bits of delay per node and allows 16 modules in the ring. (Note that the protocol may be modified to accommodate 32 modules if required.) The resulting source identification byte sequence as it traverses the ring is listed in TABLE 2. That is, the Source Identification Byte Definition on the Inter-Module Bus (Byte A1 of STS-1 number 2).

TABLE 2

| |
|---|
| 0000 0000 |
| 1000 0000 |
| 0100 0000 |
| 1110 0000 |
| 0001 0000 |
| 1001 1000 |
| 0101 0100 |
| 1111 1110 |
| 0000 0001 |
| 1000 0001 |
| 0100 0001 |
| 1110 0001 |
| 0001 0001 |
| 1001 1001 |
| 0101 0101 |
| 1111 1111 |

Figure 10:
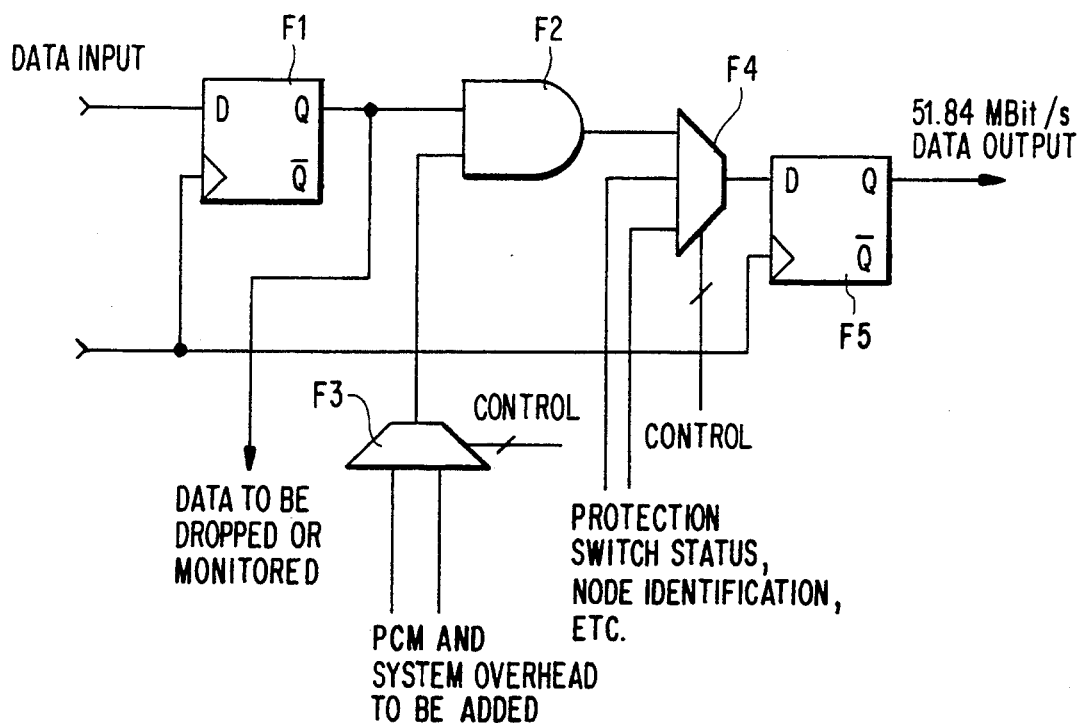
FIG. 10 illustrates a circuit for interfacing the service definition modules and common modules of the present invention.

The 155,520 MBit/s serial bus is clocked into each module interface unit and clocked into an additional flip-flop F5 before being output again. This arrangement, shown in FIG. 10, allows the module interface unit to extract and insert data onto the bus.

The close physical location of the modules in a remote digital terminal (not greater than ten meters of cable) and the low delay of the data passing through a node keeps the transmission delay around the ring relatively small. The small delay allows each node to synchronize to both the working and protection lines. In other words, each node permanently bridges its transmit (add) traffic onto both the working and protection lines, and is capable of taking its receive (drop) traffic from either the working or protection lines without changing the backplane synchronization. Buffers are required in both the transmit and receive directions between the 155.52 MBit/s serial bus (i.e., three 51.84 MBit/s serial buses) and the 6.48 MByte/s backplane buses to allow this functionality. The small delay around the ring allows these buffers to be kept to a reasonable size. The frame synchronization signals are passed around the ring in each direction in the same manner as the data, and are kept correctly aligned with the data. Each node compares the relative position (phase) of the frame synchronization signals received on the working and protection lines in order to control the buffers between the backplane and intermodule buses.

The SDM which originates the add bus in either the working or protection directions will fill the bytes in the following manner. All SPE bytes for which the originating SDM has been assigned transmit timeslots will be filled with the appropriate PCM data. All unused SPE bytes are set to a predetermined binary value, such as "11111111" or "10101010." All section and line overhead bytes will be filled with valid IEEE P802.6 packets with their busy/idle bits set to the appropriate value and each byte of the packet payload set to a binary value of "10101010" when that packet is idle (i.e., contains no data).

5. INTERMODULE PROTECTION SWITCHING FUNCTIONALITY

The counter-rotating ring architecture allows automatic protection for failures with a simple protocol. The protocol is summarized with reference to FIGS. 12(a) to 12(e), as follows, with the common module and SDMs referred to as "nodes."

A fault indication is passed in the A1 byte of the first STS-1 signal of the intermodule interconnect signal. A node will always set the A1 byte to the same value on both the add and drop buses. A fault will be declared (signaled) by sending out a fault indication $F_w$ or $F_p$ by a node whenever a failure is detected on the incoming data, frame synchronization, or clock lines for either the add or drop lines. Whenever a node detects a fault on any of the working line signals (FIG. 12(A)), a working line fault indication ($F_w$) is sent on both the add and drop lines in both the working and protection directions. This node then assumes the role of the head end (per IEEE 802.6) for the DQDB bus in the working line direction. Whenever a node detects a fault on any of the protection line signals (FIG. 12(B)), a protection line fault indication ($F_p$) is sent on both the add and drop lines in both the working and protection directions. This node then assumes the role of the head end for the DQDB bus in the protection line direction. When a node receives a fault indication $F_w$ on a working line, it passes that information downstream on the working line without altering it. At that time, the node begins taking its drop (receive) data from the protection line instead of the working line. When a node receives a fault indication $F_p$ on a protection line, the indication is passed downstream on the protection line. The node continues to take its receive data from the working drop line. Whenever a node receives a working fault indication $F_w$ on a protection line, it terminates that indication $F_w$ by altering its value before passing it on downstream. That node then assumes the role of the head end for the DQDB bus in the protection line direction.

Alternatively, when a node receives a protection fault indication $F_p$ on a working line, it terminates that indication $F_p$ by altering its value before passing it on downstream. That node then assumes the role of the head end for the DQDB bus in the working line direction.

Figure 12A:
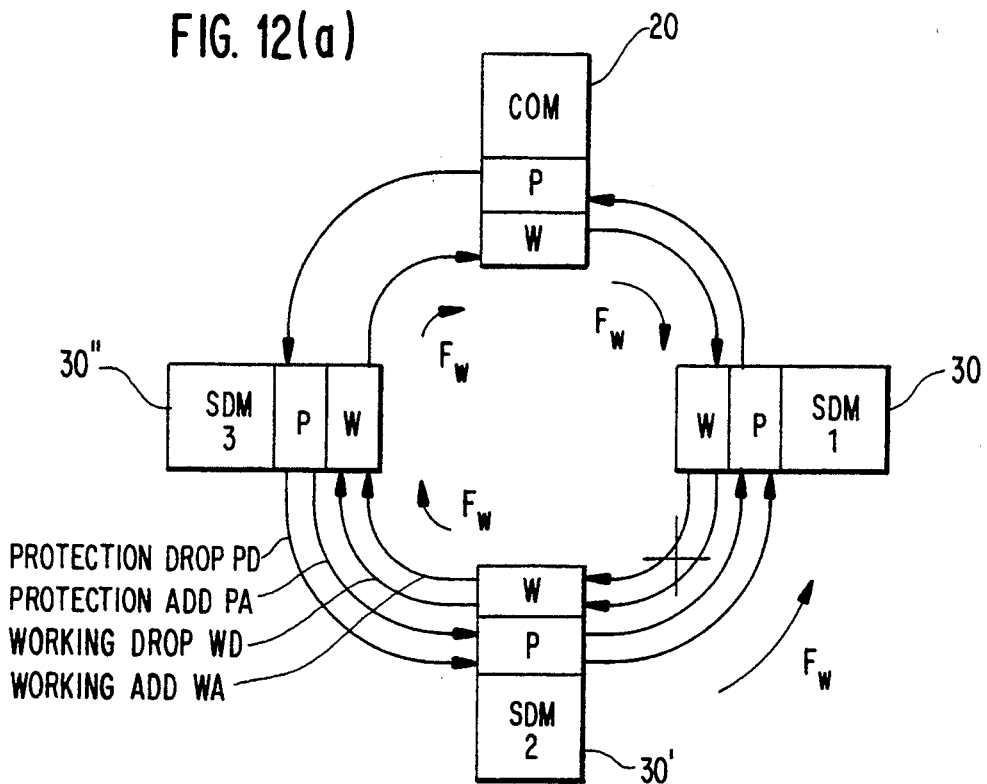
FIGS. 12(a)-(d) illustrates common failures of the counter-rotating ring configuration of the service definition modules and common modules of FIG. 11.
Figure 12B:
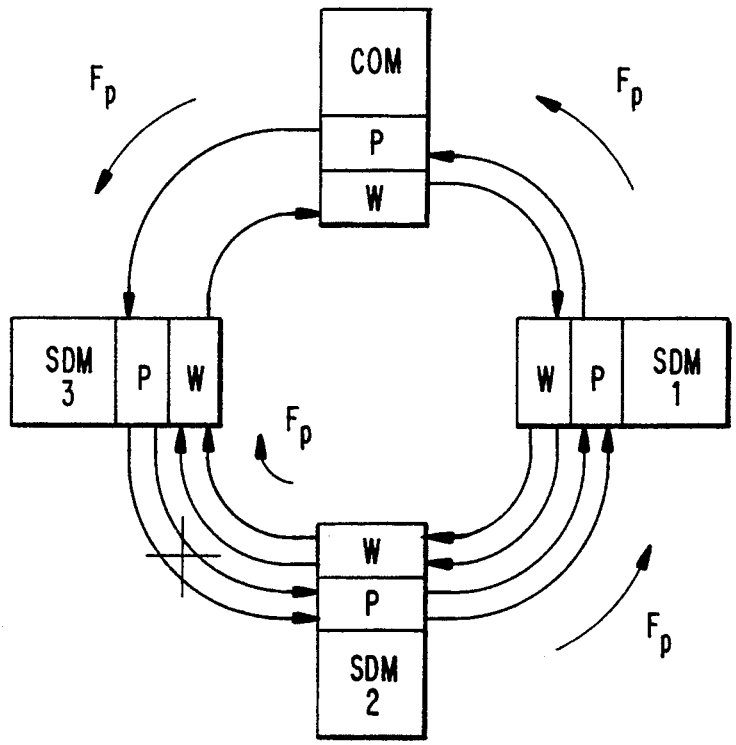
Figure 12C:
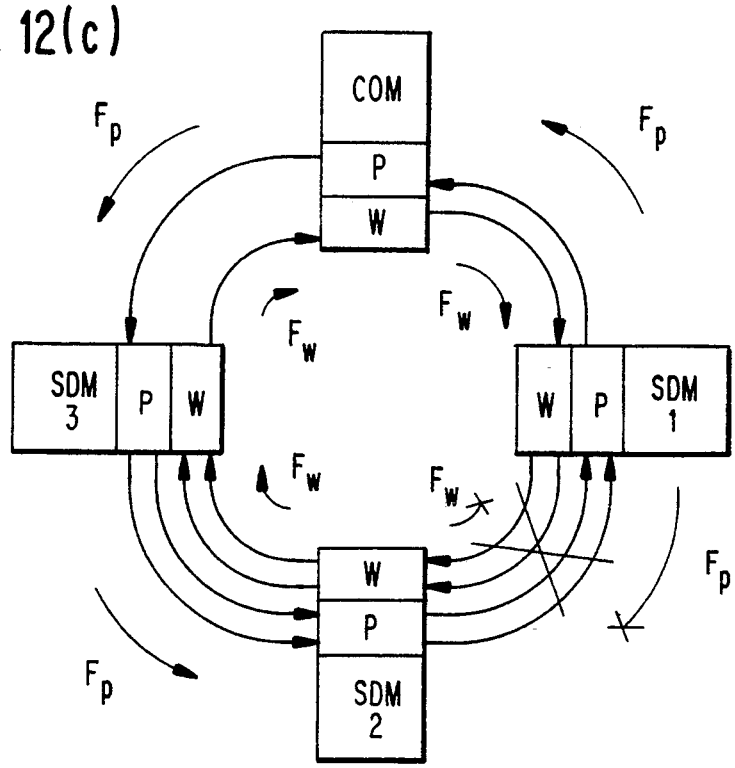

FIG. 12(c) illustrates the situation when a failure occurs in both the working and protection directions. In such a case, fault indications $F_w$ and $F_p$ are sent from the nodes on either side of the failures.

Figure 12D:
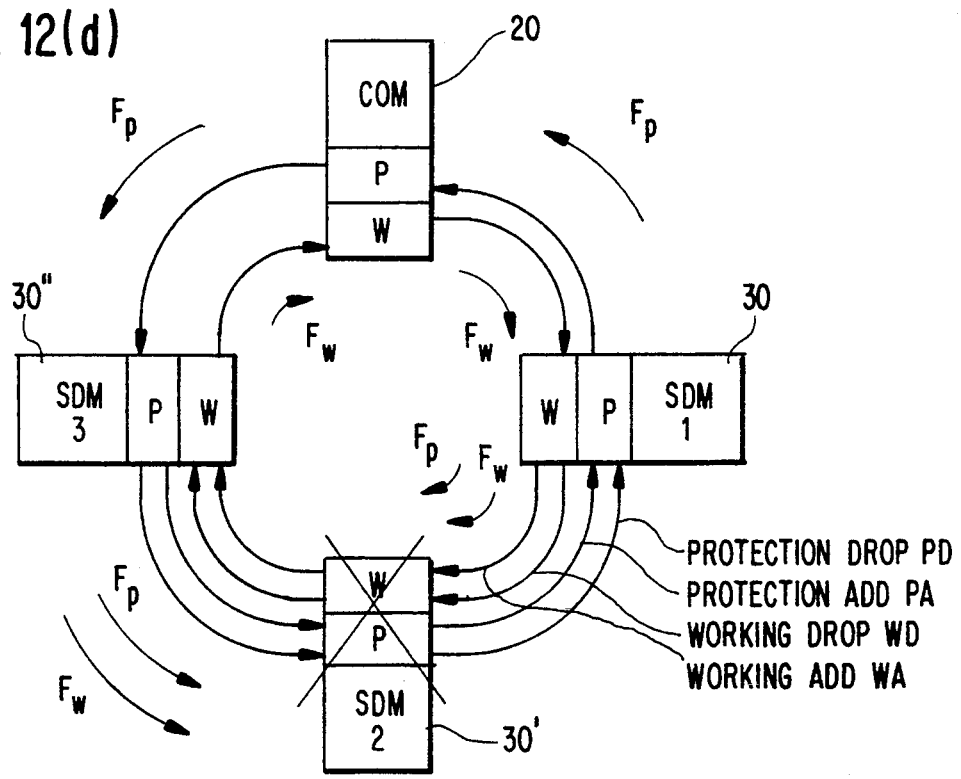

FIG. 12(d) illustrates the situation when a complete node, such as SDM 30' fails. In this situation, fault indications $F_w$ and $F_p$ are sent by the nodes upstream and downstream of the failed node.

Figure 12E:
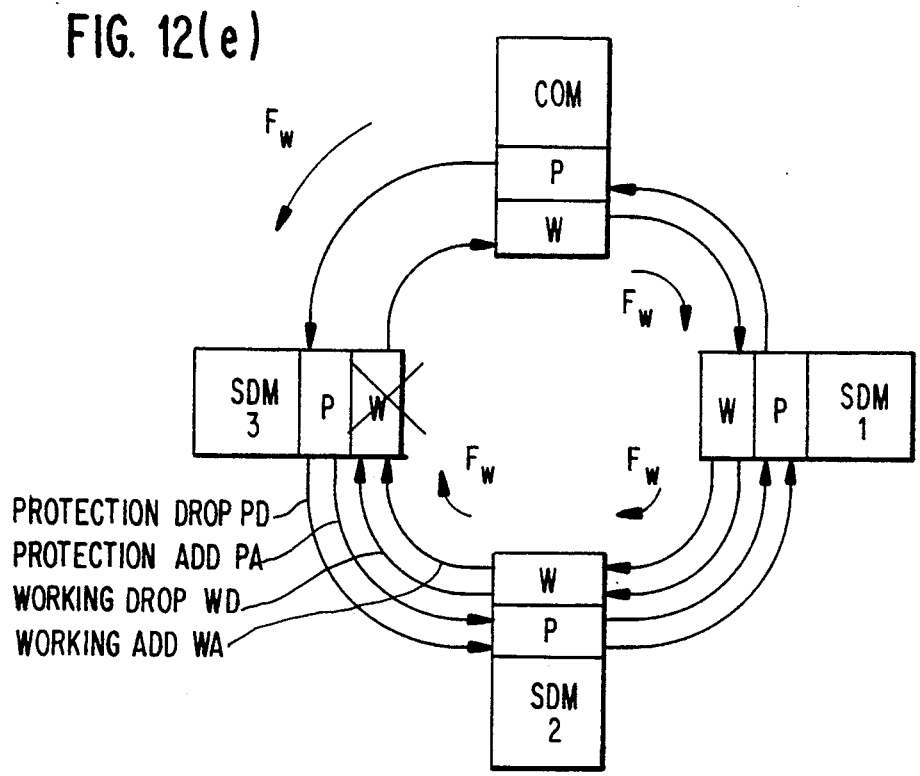
Figure 12F:
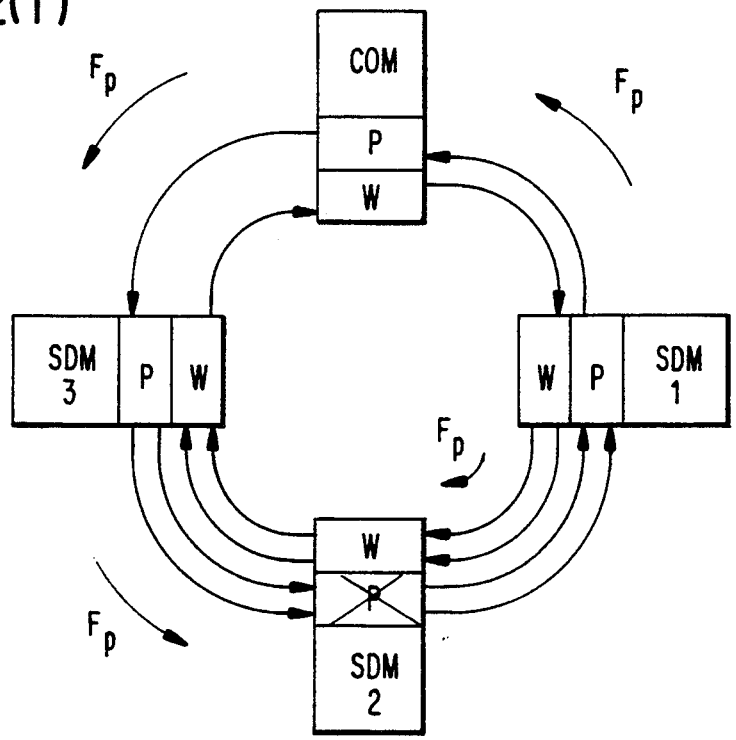

FIG. 12(e) and 12(f) illustrate when one of the working units or protection units fail.

Nodes which connect directly to the common module do not need a physical connection to an add bus for traffic coming from the common module since only drop traffic comes from the common module. (FIG. 11) The SDM that receives its drop data directly from the common module on the working line will receive a binary value of "00000000" in the A1 byte of the second STS-1 signal on the working line. This SDM sets this A1 byte to a binary value other than "00000000," and ignores the signals associated with the incoming working add line. The SDM that receives its drop data directly from the common module on the protection line will receive a binary value of "00000000" in the A1 byte of the second STS-1 signal on the protection line. This SDM sets this A1 byte to a binary value other than "00000000," and ignores the signals associated with incoming data on the protection add line.

The overhead bytes follow the same sequence and mnemonics as is used in the ANSI T1,107 SONET specifications. These sequence is shown above in TABLE 1 for an STS-3 signal, which includes three STS-1 signals that are byte-interleaved together.

The A1-1 byte definitions are as follows:

TABLE 3

| The A1-1 byte definitions are as follows: | | |
| --- | --- | --- |
| Bit Assignments $F_w$ | Bit Assignments $F_p$ | Definitions |
| 1111 | 1111 | Normal Operation |
| 1100 | xxxx | $F_w$ transmitted on the Working Line |
| 0000 | xxxx | $F_w$ transmitted on the Protection Line |
| 0011 | xxxx | Indicates that an $F_w$ has been received by a prior node on the Protection Line. |
| xxxx | 1100 | $F_p$ transmitted on the Protection Line |
| xxxx | 0000 | $F_p$ transmitted on the Working Line |
| xxxx | 0011 | Indication that an $F_p$ has been received by a prior node on the Working Line. |

The A1-2 byte is set to "00000000" if it originates on a drop line at the common module. Its value is always changed to be other than "00000000" on the drop or add lines between SDMs.

There has thus been shown and described a novel digital subscriber loop carrier system which fulfills all the objects and advantages sought therefor. Many changes, modifications, variations and other uses and applications of the subject invention will, however, become apparent to those skilled in the art after considering the specification and the accompanying drawings which disclose preferred embodiments thereof. All such changes, modifications, variations and other uses and applications which do not depart from the spirit and scope of the invention are deemed to be covered by the invention which is limited only by the claims which follow.

What is claimed is:

1. A digital subscriber loop carrier system of a telecommunication network having a plurality of subscriber units comprising:
   at least one service definition module, coupled to the subscriber units for interfacing said subscriber units to the system;
   a common module, said common module comprising means for performing common functions of the system and means for transferring subscriber data between the system and a central location; and
   interface means, including pulse coded modulation buses, for interconnecting said common module to said at least one service definition module and for transferring said subscriber data and common control data between said common module and said at least one service definition module via said pulse coded modulation buses based on a common pulse coded modulation frame format wherein said at least one service definition module comprises channel units for interfacing to the subscriber units, said channel units being operative to receive and transmit said subscriber data having data rate between DS0 and at least OC-1 rates; and a common control and interface unit coupled to said channel units and said interface means for transferring data to and from said common module.

2. The digital subscriber loop carrier system as defined in claim 1, wherein said at least one service definition module further comprises bus means, coupled to said channel units and said common control and interface unit and arranged in a STS-N format having a predetermined bandwidth, for transferring said subscriber data and said common control data between channel units and said common control and interface unit within said STS-N format and said predetermined bandwidth.

3. The digital subscriber loop carrier system as defined in claim 2, wherein said bus means comprises separate pulse coded modulation transmit and receive buses.

4. The digital subscriber loop carrier system as defined in claim 2, wherein said STS-N format includes a SONET payload having a predetermined number of timeslots, and wherein each of said channel units comprises means for outputting said subscriber data to said bus means into one of said timeslots of said SONET payload.

5. The digital subscriber loop carrier system as defined in claim 1, wherein said at least one service definition module comprises a plurality of groups of channel units; and a plurality of sets of transmit and receive buses, each set of transmit and receive buses interfacing a group of said channel units to said common control and interface unit.

6. The digital subscriber loop carrier system as defined in claim 1, wherein said channel units comprises means for interfacing the system to said subscriber units for data rates greater than or equal to DS1; and means for servicing SONET virtual tributaries by performing virtual tributary formatting and overhead processing.

7. The digital subscriber loop carrier system as defined in claim 1, wherein said common module comprises at least one of means for monitoring alarm conditions, means for performing time slot interchange functions, means for common channel signaling, means for processing SONET data communications channels, means for multiplexing and demultiplexing data, and means for interfacing high-speed optical devices with said common module.

8. The digital subscriber loop carrier system as defined in claim 1, wherein said interface means comprises transmit and receive buses having a STS-3 bandwidth for transferring said subscriber data and common control data between said common module and said at least one service definition module.

9. The digital subscriber loop carrier system as defined in claim 1, further comprising a plurality of service definition modules and wherein said interface means comprises means for coupling said common module to said plurality of service definition modules in a counter-rotating ring configuration, said ring configuration comprising add and drop buses in a working direction; and add and drop buses in a protection direction.

10. A digital subscriber loop carrier system as defined in claim 9, wherein said interface means further comprises frame synchronization and clock lines, and wherein each of said common module and each of said plurality of service definition modules comprises detecting means for detecting any one of a plurality of faults on said interface means; and means for outputting a fault indication signal corresponding to said detected one of said plurality of faults.

11. A digital subscriber loop carrier system as defined in claim 10, wherein said fault indication signal comprises one of a plurality of predetermined bit patterns, each of which uniquely identify each of said plurality of faults.

12. A digital subscriber loop carrier system as defined in claim 10, wherein said detecting means comprises:
   means for outputting a fault indication signal on said add and drop buses in said working and protection directions when a fault is detected on any one of said add and drop buses in said working direction;
   means for receiving a fault indication signal on said drop bus in said working direction and for passing said fault indication signal to an adjacent one of said common module and service definition module in one of said add and drop buses in said working direction; and
   means for receiving subsequent data from said drop bus in said protection direction.

13. A digital subscriber loop carrier system as defined in claim 10, wherein said detecting means comprises:
   means for outputting a fault indication signal on said add and drop buses in said working and protection directions when a fault is detected on any one of said add and drop buses in said protection direction;

means for receiving a fault indication signal on said drop bus in said protection direction and for passing said fault indication signal to an adjacent one of said common module and service definition module in one of said add and drop buses in said protection direction; and means for receiving subsequent data from said drop bus in said working direction.

14. A digital subscriber loop carrier system as defined in claim 10, wherein said detecting means comprises:
means for receiving a fault indication signal on one of said add and drop buses in said protection direction;
means for modifying said fault indication signal so as to indicate a fault has occurred in said protection direction; and
means for passing said modified fault indication signal to an adjacent one of said common module and service definition module.

15. A digital subscriber loop carrier system as defined in claim 10, wherein said detecting means comprises:
means for receiving a fault indication signal on one of said add and drop buses in said working direction;
means for modifying said fault indication signal to indicate whether a fault has occurred in said working direction; and
means for passing said modified fault indication signal to an adjacent one of said common module and service definition module.

16. A digital subscriber loop carrier system as defined in claim 1, wherein said common module comprises an optical interface for interfacing the system to said central location.

17. A digital subscriber loop carrier system as defined in claim 16, wherein said optical interface comprises an OC-3 interface.

18. A digital subscriber loop carrier system as defined in claim 16, wherein said optical interface comprises an OC-12 interface.

19. A digital subscriber loop carrier system as defined in claim 1, wherein said common pulse coded modulation frame format includes SONET STS signals.

20. A digital subscriber loop carrier system as defined in claim 1, wherein said common module comprises means for inserting monitoring data and virtual tributary overhead control data to data having a data rate less than DS-1.

21. A digital subscriber loop carrier system as defined in claim 1, wherein said pulse coded modulation buses transfer both pulse coded modulation data and common control communication data including status, protection switching, provisioning, and alarm reporting information.

22. A digital subscriber loop carrier system as defined in claim 1, wherein said interface means comprises STS-N pulse coded modulation buses between said common module and said at least one service definition module, and wherein common control communication data is transferred according to one of a Distributed Queue, Dual Bus (DQDB) and Token Ring protocol.

23. A digital subscriber loop carrier system as defined in claim 1, wherein said interface means comprise STS-N pulse coded modulation buses, and wherein said common module comprises first processing means for processing data having a data rate greater than or equal to DS1 originating in said at least one service definition module and second processing means for processing data having a data rate less than DS1 in said at least one service definition module.

24. A digital subscriber loop carrier system as defined in claim 23, further comprising: first and second buses; a common control and interface unit, coupled to said first bus and said interface means, for transferring data between said first bus and said interface means; an STS-1 overhead unit, coupled to said first and second buses, for performing STS-1 path overhead processing; and a DS1 and VT overhead unit, coupled to said first and second buses, for adding DS1 and VT overhead bits to said pulse coded modulation data, wherein said first processing means comprising said first bus, said common control and interface unit, and said STS-1 overhead unit, and said second processing means comprising said first and second buses, said common control and interface unit; said DS1 and VT overhead unit; and said STS-1 overhead.

25. A digital subscriber loop carrier system as defined in claim 24, wherein said second processing means further comprising a common channel signaling global unit, coupled to said first bus for performing embedded operations channel and common channel signaling processing.

26. A digital subscriber loop carrier system as defined in claim 1, wherein said at least one service definition module comprises a plurality of service definition modules, each coupled to said subscriber unit and wherein said common module is interconnected to said plurality of service definition modules in one of a star, ring, and linear add/drop multiplex bus network configuration for transferring said subscriber data and common control data between said common module and said plurality of service definition modules 27. A digital subscriber loop carrier system as defined in claim 1, wherein said at least one service definition module comprises a plurality of service definition modules, each coupled to said subscriber units wherein said common module and each of said plurality of service definition modules are assigned a unique address for separately identifying each of said modules, said system further comprising address means, disposed in said common module and each of said plurality of service definition modules, for assigning the unit address to said common module and each of said service definition modules, said address means comprising means for receiving into a present module a data value from an adjacent module, said data value constituting the unique address for the adjacent module; means for modifying said data value, said modified data value constituting the unique address of the present module; and means for transferring said modified data value from the present module to a next adjacent module.

28. A digital subscriber loop carrier system of a telecommunication network having a plurality of subscriber units comprising:
a plurality of service definition modules, each being coupled to a subset of the subscriber Units, for interfacing the subscriber units to the system;
a common module, said common module comprising means for performing common functions of the system and means for transferring subscriber data between the system and a central location; and
interface means, including add and drop lines in both working and protection directions configured as a counter-rotating ring, for interconnecting said common module to said plurality of service definition modules and for transferring data between said common modules and said service definition module via said add and drop lines based on a SONET STS signal, said data including said subscriber data, common control and signaling data and protection switching protocol data, wherein said common control and signaling data and said protection switching protocol data is transferred in overhead bytes of said SONET STS signal.

* * * * *

UNITED STATES PATENT AND TRADEMARK OFFICE
CERTIFICATE OF CORRECTION

PATENT NO. : 5,355,362
DATED : October 11, 1994
INVENTOR(S) : Gorshe et al.

It is certified that error appears in the above-identified patent and that said Letters Patent is hereby corrected as shown below:

Column 5, line 17, delete "20°" and insert --20--.
Column 11, line 29, delete "CI-1" and insert --C1-1--;
Column 11, line 30, delete "Di-1" and insert --D1-1--;
Column 11, line 31, delete "Ki-1" and insert --K1-1--;
Column 11, line 35, delete "Zi-1" and insert --Z1-1--;

Signed and Sealed this

Twenty-fourth Day of January, 1995

Attest:

BRUCE LEHMAN

Attesting Officer

Commissioner of Patents and Trademarks